(12) United States Patent
Ma et al.

(10) Patent No.: US 11,275,968 B2
(45) Date of Patent: Mar. 15, 2022

(54) SUPER-SPARSE IMAGE COMPRESSION USING CROSS-BAR NON-VOLATILE MEMORY DEVICE

(71) Applicant: Western Digital Technologies, Inc., San Jose, CA (US)

(72) Inventors: Wen Ma, Sunnyvale, CA (US); Minghai Qin, San Jose, CA (US); Won Ho Choi, Santa Clara, CA (US); Pi-Feng Chiu, Milpitas, CA (US); Martin Lueker-Boden, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 259 days.

(21) Appl. No.: 16/275,167

(22) Filed: Feb. 13, 2019

(65) Prior Publication Data

US 2020/0257936 A1 Aug. 13, 2020

(51) Int. Cl.
*G06K 9/62* (2006.01)
*G06K 9/00* (2006.01)
*G06T 1/00* (2006.01)

(52) U.S. Cl.
CPC ....... *G06K 9/6255* (2013.01); *G06K 9/00973* (2013.01); *G06K 9/6262* (2013.01); *G06T 1/0007* (2013.01)

(58) Field of Classification Search
None
See application file for complete search history.

(56) References Cited

U.S. PATENT DOCUMENTS 7,003,039 B2 2/2006 Zakhor et al.
9,646,243 B1 5/2017 Gokmen
(Continued)

FOREIGN PATENT DOCUMENTS

CN 108182712 A 6/2018

OTHER PUBLICATIONS

Qihui, Zhang et al.; "A VLSI Implementation of Pipelined JPEG Encoder for Grayscale Images"; Signals, Circuits and Systems; ISSCS 2009; International Symposium on IEEE; <https://ieeexplore.ieee.org/abstract/document/5206176>.
(Continued)

*Primary Examiner* — Matthew C Bella
*Assistant Examiner* — Brian D Shin
(74) *Attorney, Agent, or Firm* — Loza & Loza, LLP; Gabriel Fitch

(57) ABSTRACT

Exemplary methods and apparatus are disclosed that implement super-sparse image/video compression by storing image dictionary elements within a cross-bar resistive random access memory (ReRAM) array (or other suitable cross-bar NVM array). In illustrative examples, each column of the cross-bar ReRAM array stores the values for one dictionary element (such as one 4×4 dictionary element). Methods and apparatus are described for training (configuring) the cross-bar ReRAM array to generate and store the dictionary elements by sequentially applying patches from training images to the array using an unstructured Hebbian training procedure. Additionally, methods and apparatus are described for compressing an input image by applying patches from the input image to the ReRAM array to read out cross-bar column indices identifying the columns storing the various dictionary elements that best fit the image. This may be done in parallel using a set of ReRAM arrays.

31 Claims, 18 Drawing Sheets

(56) References Cited

U.S. PATENT DOCUMENTS

| | | | |
|---|---|---|---|
| 9,659,249 B1 | 5/2017 | Copel | |
| 10,171,084 B2* | 1/2019 | Lu | G11C 13/0069 |
| 2003/0058943 A1* | 3/2003 | Zakhor | H04N 19/51 |
| | | | 375/240.12 |
| 2018/0075338 A1 | 3/2018 | Gokmen | |
| 2018/0095930 A1 | 4/2018 | Lu et al. | |

OTHER PUBLICATIONS

Nejati, Mansour et al.; "Boosted Dictionary Learning for Image Compression"; IEEE Trans. Image Processing 25.10 (2016): 4900-4915; <https://ieeexplore.ieee.org/document/7536205>.

Sheridan, Patrick et al; "Sparse coding with memristor networks"; Nature Nanotechnology 12.8 (2017):784-790; <https://www.nature.com/articles/nnano.2017.83>.

Lapedus, Mark; "What Happened to ReRAM?" Semiconductor Engineering; Sep. 21, 2017; 27 pages; <https://semiengineering.com/what-happened-to-reram/>.

* cited by examiner

US 11,275,968 B2

SUPER-SPARSE IMAGE COMPRESSION USING CROSS-BAR NON-VOLATILE MEMORY DEVICE

FIELD

Aspects of the disclosure relate generally to cross-bar non-volatile memory (NVM) devices, and more specifically, to image compression using such devices.

INTRODUCTION

Image compression is useful for a wide variety of applications, such as for archiving a large database of images within systems that have limited storage or for generating compressed images that can be quickly and efficiently processed, as may be useful for image pattern recognition. For many applications, such as those within mobile devices, size or power may be limited. At least some aspects of the methods and apparatus disclosed herein are directed to providing efficient image compression, particularly consuming minimal power and circuit space.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a device that includes: a cross-bar non-volatile memory (NVM) array; a training image input circuit configured to input a set of training images; and a cross-bar training circuit configured to generate and store a dictionary of image elements within the cross-bar NVM array for use in image compression, wherein the cross-bar training circuit is configured to generate the dictionary of image elements from the set of training images.

Another embodiment of the disclosure provides a method for training a cross-bar NVM array. The method includes: applying a set of image compression training images to the cross-bar NVM array; and determining and setting cross-point values of the cross-bar NVM array based on the image compression training images to generate and store a dictionary of image elements within the cross-bar NVM array for use in image compression.

Yet another embodiment of the disclosure provides a device that includes: a cross-bar NVM array configured to store a dictionary of image elements; a cross-bar NVM dictionary-based image compression circuit configured to apply a set of portions of an input image to the cross-bar NVM array and, for each portion, to obtain an identifier value from the cross-bar NVM array identifying a particular image element from the dictionary image elements that corresponds to that portion; and a dictionary element identifier output circuit configured to output the identifier values for each of the portions of the input image. The portions may be, for example, image patches.

Still another embodiment of the disclosure provides a method for image compression using a cross-bar NVM array configured to store a dictionary of image elements. The method includes: applying a set of portions of an input image to the cross-bar NVM array; for each portion, obtaining an identifier value from the cross-bar NVM array identifying a particular image element from the dictionary that corresponds to that portion; and outputting the identifier values for each of the portions of the input image, the identifier values collectively representing a compressed representation of the input image. The portions again may be, e.g., image patches.

DETAILED DESCRIPTION

Figure 1:
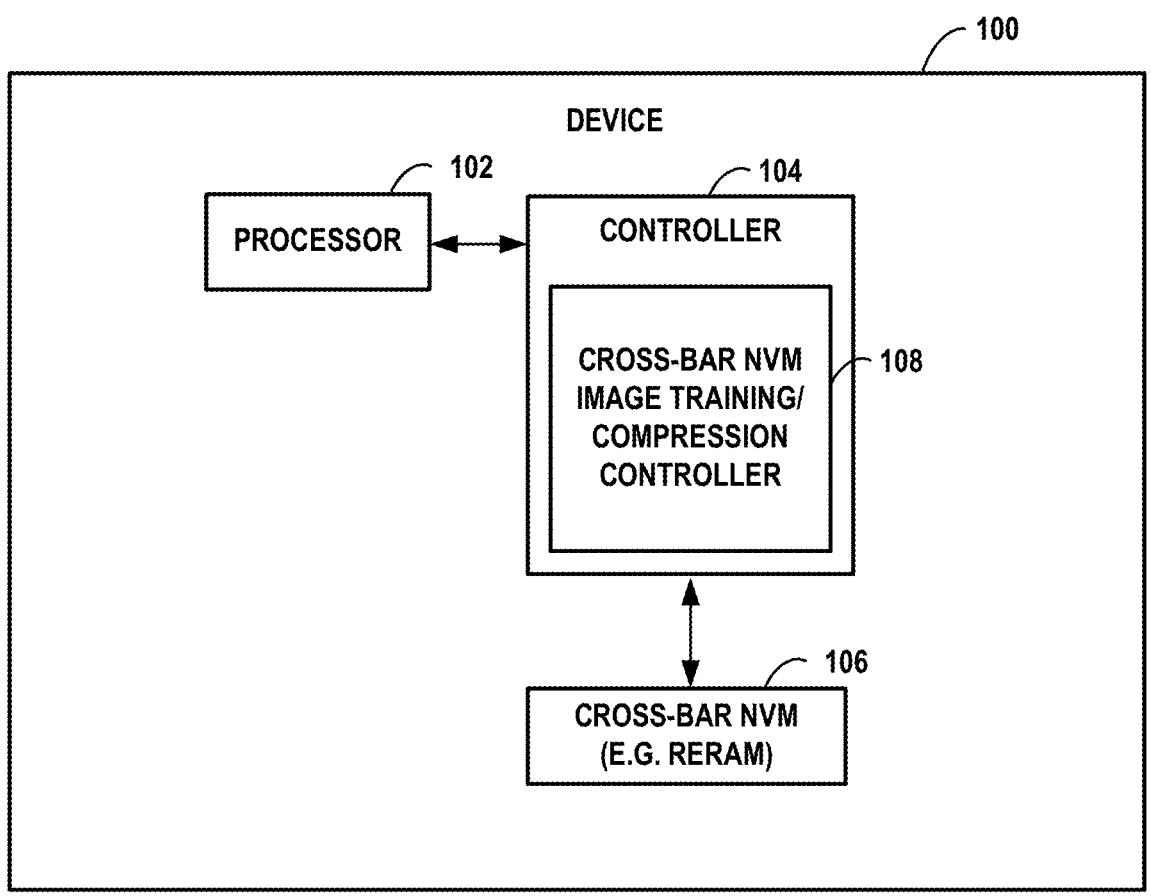
FIG. 1 is a block diagram of a device configured for image compression using a cross-bar NVM array such as a cross-bar resistive random access memory (ReRAM) array.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The main examples herein relate to devices or apparatus having persistent or non-volatile memory (NVM) arrays, and in particular to cross-bar NVM array devices. Many of the examples described herein use resistive random access memory (ReRAM) arrays. However, aspects of the methods and apparatus described herein may use forms of NVM, such as Floating Gate Transistors, phase-change memory (PCM) arrays, magneto-resistive random access memory (MRAM) arrays, as well as to storage devices with storage class memory (SCM) layers. The devices and apparatus described herein may be, e.g., embedded devices, such as Internet of Things (IoT) devices, and may be configured to perform embedded or IoT applications or functions.

Overview

Image compression is useful for a wide variety of applications, such as for archiving a large database of images within systems that have limited storage or for generating compressed images that can be quickly and efficiently processed, as may be useful for image pattern recognition. One form of image compression is dictionary-based compression wherein a dictionary or other compendium of image elements (which may be called primitives or atoms) is maintained and used to compress an input image. Each dictionary element might represent, for example, a different 4×4 arrangement of pixels. Individual patches (or more generally portions) of the input image to be compressed are replaced with one or more of the dictionary elements that best correspond to the patch (either individually or in some linear combination). A patch may be defined as a collection of pixels. The compressed image then may be a list of the dictionary image elements that best correspond to each patch of the input image, and the order in which they are arranged in the image. As such, the image itself need not be stored, just the list of dictionary elements that compose the image, and the order in which the elements appear in the image (and, in some cases, values representing the relative brightness of particular image elements). To display the compressed image, a device retrieves the list of image elements and displays the elements (or combinations of those elements) in their proper two-dimensional arrangement (and with the appropriate brightness value). When relatively few image dictionary elements are used to represent each individual patch of the input image, the compression may be regarded as sparse compression. When only a single dictionary element is used per patch, the compression may be regarded as super-sparse.

Herein, methods and apparatus are described that implement super-sparse image compression within a device by storing the image dictionary elements within a cross-bar ReRAM array (or other suitable cross-bar NVM array). In illustrative examples, each column of the cross-bar ReRAM array stores the values for one dictionary element (such as one 4×4 dictionary element). Various methods and apparatus are described herein for training (configuring) the cross-bar ReRAM array to generate and store the dictionary elements by sequentially applying patches from training images to the ReRAM array using an unstructured Hebbian training procedure. Additionally, various methods and apparatus are described for then compressing an input image by applying patches from the input image to the ReRAM array to read out cross-bar column indices identifying the columns storing the various dictionary elements that best fit the image. This may be done in parallel using a set of ReRAM arrays.

Note that, herein, a cross-bar NVM array or a cross-bar ReRAM is an NVM array have a cross-bar configuration and configured to permit the setting cross-point resistance values. Such devices also may be referred to as memristive cross-bar arrays and the individual cross-point elements as memristors. A cross-bar array may be an array of microelectronic switches that, for example, connect each wire in a set of (parallel) wires to every wire of a second set of (parallel) wires intersecting the first set. A ReRAM may store information, as 1's or 0's, corresponding to whether a particular memristor is in a relatively high or low resistance state. It is noted that there is presently a company named Crossbar, which provides such devices. However, the present disclosure is not limited to ReRAM cross-bar devices provided by that particular company.

Notably, within at least some of the illustrative training techniques described herein, the methods and apparatus operate to both generate the elements of the dictionary and store the elements in the ReRAM array. That is, the dictionary of image elements to be stored in the ReRAM need not be pre-determined prior to training the ReRAM. As such, a particular ReRAM array can be trained using a particular set of training images to tailor that particular device to efficiently compress particular types of images. One device, for example, may be trained to efficiently compress images of human faces, whereas another device may be trained to efficiently compress images of inanimate objects. In other examples, the images to be compressed are not photographic images, but images generated by devices such as RADAR or SONAR systems, or images produced by CAT scan devices, MRI devices, etc. Generally speaking, any two-dimensional arrangement of information may constitute an "image" that can be compressed. (In some alternative implementations, the dictionary of image elements instead is pre-determined using some other device or system, such as a centralized server, with the resulting dictionary of elements stored in the ReRAM.) It is also noted that the procedures by which the apparatus compresses an image may be regarded as inference procedures, and the compression device or apparatus may be regarded as an inference engine.

Illustrative Embodiments

FIG. 1 is a block diagram of a device 100 configured for NVM dictionary-based image compression and decompression. The device 102 may be, for example, a component of a self-driving control system for a vehicle, a component of a security system for processing facial images, or an Internet of Things (IoT) device. The device 102 may be embedded within another device or system or may be a discrete device. The device 100 includes, in this example, a processor 102 and a controller 104. In some embodiments, the processor 102 and the controller 104 are integrated together. The processor 102 may be any system, circuit, or device with a compatible interface for communicating with the device 104, such as a central processing unit (CPU), a graphics processing unit (GPU), custom application specific integrated circuit (ASIC), e.g. an artificial intelligence (AI) processor or co-processor, microcontroller unit (MCU), a field programmable gate array (FPGA), a digital signal processor (DSP), etc. The interface between the processor 102 and the controller 104 may be a custom or standard interface. The processor 102 provides commands, data, or other information to the controller 104, such as images to be compressed. The device 100 also has a cross-bar NVM 106, such as a NOR-type cross-bar ReRAM. By "cross-bar NVM," it is meant that the NVM device includes at least one cross-bar NVM array. The cross-bar NVM 106 may include other storage elements, as well as various on-chip circuit/ logic components. The controller 104 is coupled to the cross-bar NVM 106. In other examples, the controller 104 and the cross-bar NVM 106 might be integrated together.

The controller 104 controls the cross-bar NVM 106. The controller 104 may include any type of processing device, such as a microprocessor, microcontroller, embedded controller, logic circuit, software, firmware, or the like. In some embodiments, some or all of the functions described herein as being performed by the controller 104 may instead be performed by another element of the device 100. For example, the device 100 may include a microprocessor, a microcontroller, an embedded controller, a logic circuit, software, firmware, or any kind of processing device, for performing one or more of the functions described herein as being performed by the controller 104. In some embodiments, one or more of the functions described herein as being performed by the controller 104 are instead performed by the processor 102.

The cross-bar NVM 106 receives data or other information from the controller 104 and stores the information within its storage elements or arrays. In particular, in various examples described herein, the NVM 106 receives sets of training images and stores image dictionary elements derived from the training elements within its cross-bar arrays. The cross-bar NVM 106 may thereafter receive images to be compressed, which are applied to the cross-bar arrays of the cross-bar NVM 106 to compress the images (by, e.g., reading out or otherwise obtaining cross-bar column array indices that identify the dictionary elements that correspond to patches of the image). The cross-bar NVM 106 may be any type of NVM configured to provide cross-bar storage of values, such as a cross-bar ReRAM array.

The controller 104 and cross-bar NVM 106 can be configured, alone or in combination, to perform the processes described herein for training (configuring) the cross-bar elements of the NVM 106 and then compressing images using the cross-bar elements. As shown in FIG. 1, the exemplary controller 104 includes a cross-bar NVM dictionary-based image training/compression controller 108, which is configured to control the training of the cross-bar elements of the NVM 106 and the subsequent compressing of input images using the NVM cross-bar elements. In other examples, the training procedures used, e.g., to generate or derive the various dictionary elements are performed off-line using a separate device (such as a remote server) and the resulting values of the dictionary elements are then stored in the cross-bar NVM 106. It is noted that a subsequent decompression of images may be performed by the processor 102, which may be programmed or configured to obtain a compressed version of an image from NVM 106 via the controller 104 (e.g. a list of dictionary elements that correspond to the patches of the image and any corresponding grayscale values) and to then decompress the image by looking up the dictionary elements from its memory components and assembling the elements into two-dimensional image.

Figure 2:
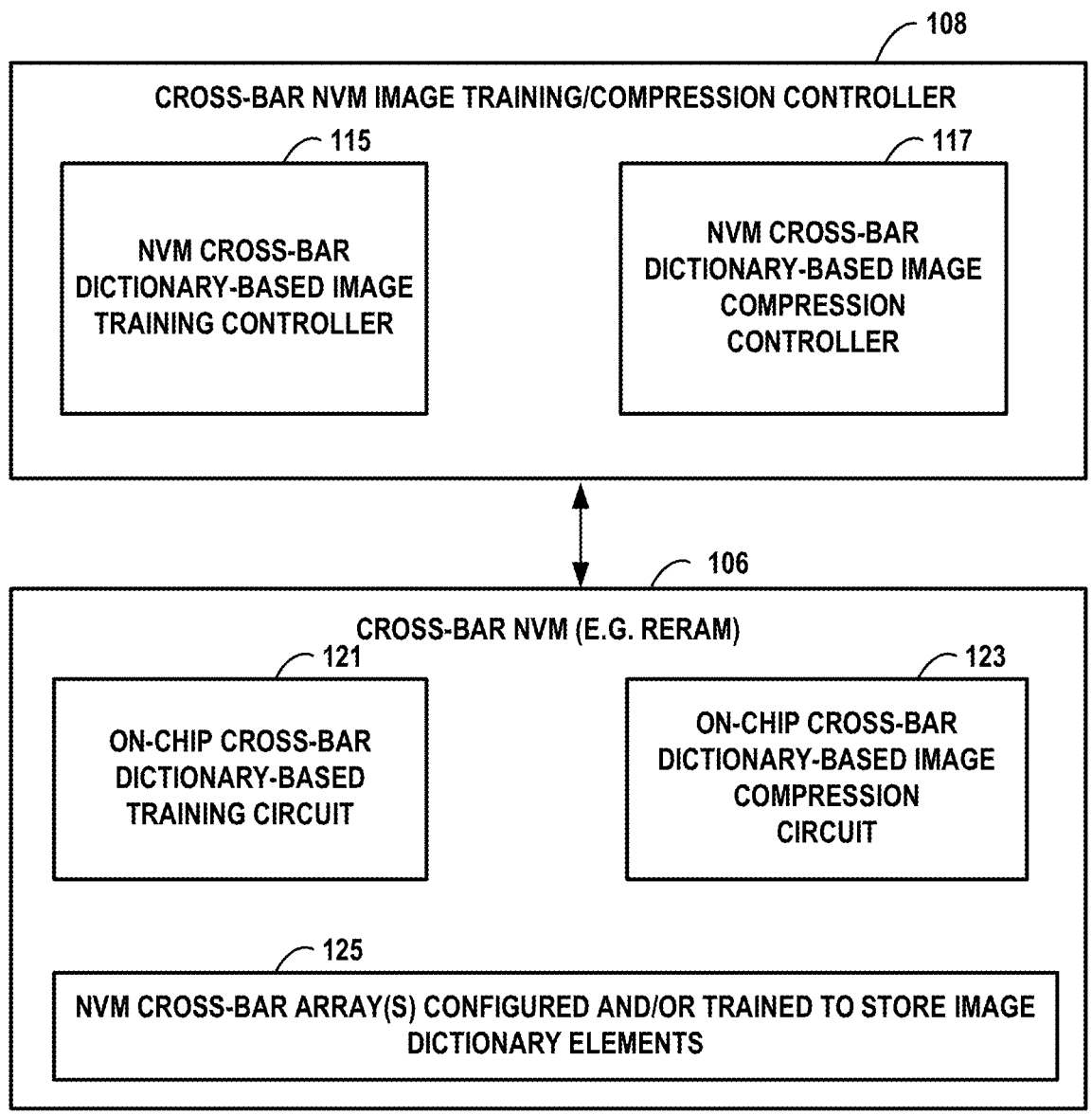
FIG. 2 is a block diagram illustrating selected components of the device of FIG. 1 for training and image compression, including selected components of the NVM itself.

FIG. 2 illustrates selected components of the image training/compression cross-bar NVM controller 108 and the cross-bar NVM 106 of FIG. 1, particularly the components used for image dictionary training and subsequent image compression. Briefly, in the example of FIG. 2, the NVM controller 108 includes an NVM cross-bar dictionary-based image training controller 115 configured to apply a set of input training images (received from the processor 102 of FIG. 1) to the cross-bar NVM array 106 for use in configuring cross-point resistance values of one or more cross-bar NVM arrays 125 of the NVM 106 to generate and store a dictionary of image elements within the cross-bar NVM array(s) 125. The manner by which the training images are applied to the cross-bar NVM array is described below. (See, e.g., FIG. 5.) In the example of FIG. 2, the controller 108 also includes an NVM cross-bar dictionary-based image compression controller 117 configured to apply an input image to be compressed (received from the processor 102 of FIG. 1) to the cross-bar NVM array, and to receive a compressed version of the image from the NVM 106 for relaying back to the host device. The manner by which an image may be applied to the trained cross-bar NVM array to compress the image is described below. (See, e.g., FIG. 7.)

In the example of FIG. 2, the NVM 106 includes on-chip circuitry (or other suitable logic components) configured to perform the aforementioned training and compression functions based on images received from the controller 108. Briefly, in the illustrative example, the NVM 106 includes an on-chip cross-bar dictionary-based training circuit 121 configured to apply the set of training images received from the training controller 115 to the cross-bar NVM array(s) 125 to configure the cross-point resistance values of the cross-bar NVM array(s) 125 based on the training images to generate and store the dictionary of image elements within the cross-bar NVM array(s) 125. The NVM 106 also includes an on-chip cross-bar dictionary-based image compression circuit 123 configured to thereafter apply a set of patches of an input image received from the compression controller 117 to the cross-bar NVM array(s) 124 and, for each patch, to read out (or otherwise obtain) an identifier value from the cross-bar NVM array(s) 125 identifying a particular image element from the dictionary image elements that corresponds to that patch, so as to obtain or generate a compressed representation of the image. The circuits 121 and 123 of the NVM 106 may be, for example, under-the-array or beside-the-array circuit components. In other examples, the NVM 106 may instead just include the cross-bar array(s) 125, and any logic for performing the training and the subsequent data compression resides in the device controller.

Super-sparse image compression may be used, wherein, as noted above, each patch of an image to be compressed is represented by (e.g. replaced) with a single image dictionary element rather than some combination of two or more image elements. Within illustrative examples for compressing monochrome (i.e. black & white) images, the image dictionary that is generated has a total of thirty-two distinct image elements (or atoms or primitives), each consisting of a different 4×4 arrangement or matrix of pixels, for a total of sixteen pixels in each image element. The cross-bar ReRAM array is configured (trained) to store a different one of the image elements in a separate column of the array. Hence, to store the thirty-two distinct image elements of the dictionary, thirty-two columns are used. Each column includes at least sixteen cross-point elements to store the sixteen pixels of the corresponding image element. An individual pixel of an individual image element may be stored in a cross-point element by programming (setting) the resistance value of that cross-point element to a value representative of the grayscale intensity of that particular pixel. For example, if the cross-point elements are configured to store a range of normalized resistance values from 0 to 1, a resistance of 0 may be used to represent a white pixel, and a resistance value of 1 may be used to represent a black pixel. Intermediate resistance values represent various levels of gray.

Figure 3:
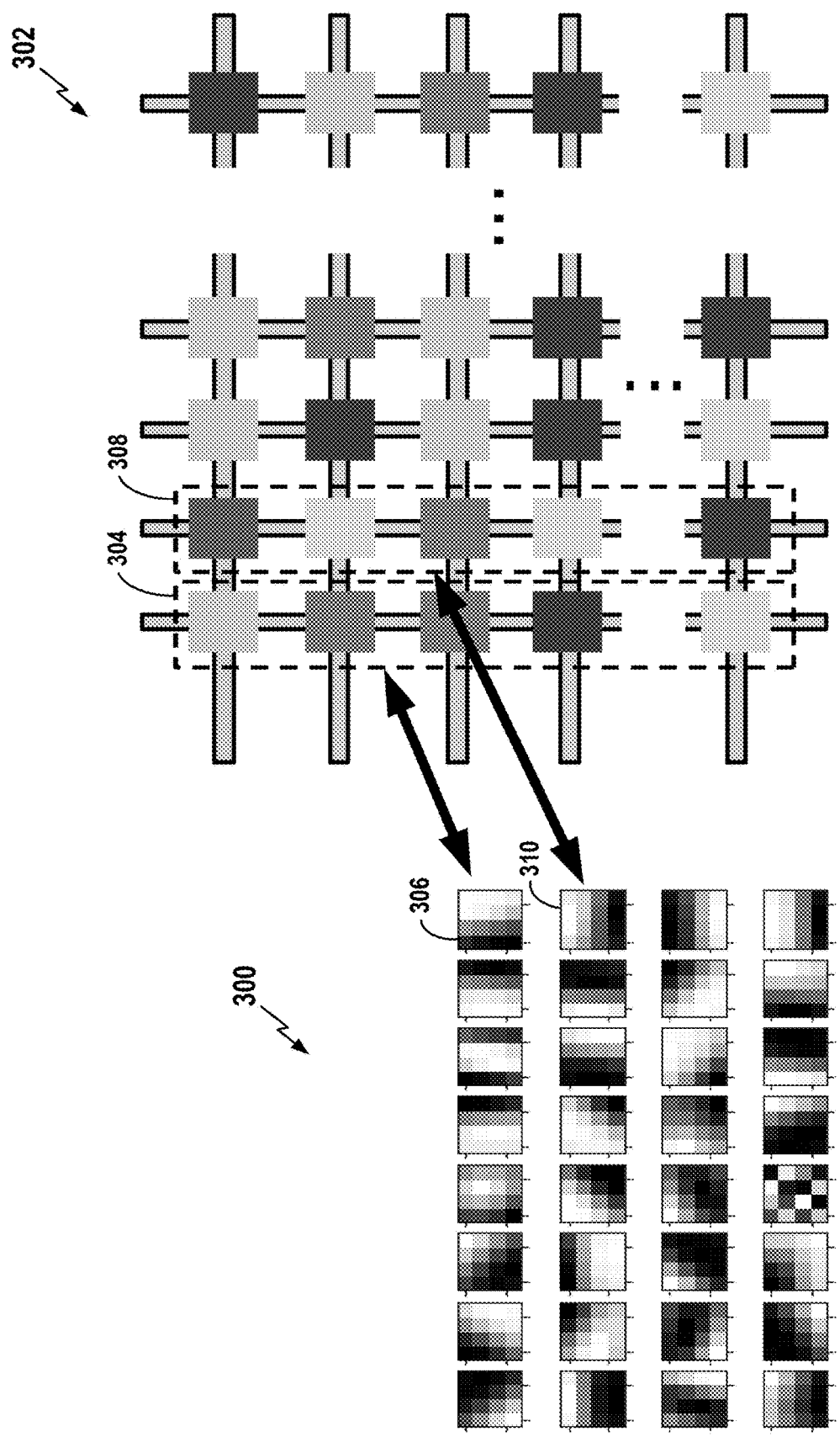
FIG. 3 is a block diagram of a cross-bar ReRAM array and an image dictionary.

FIG. 3 illustrates an exemplary image dictionary 300 with thirty-two distinct image elements, each consisting of a 4×4 pixel matrix, and also illustrates a ReRAM cross-bar array 302 having at least one column per dictionary element (e.g. at least thirty-two columns) and having at least one row per pixel of the corresponding dictionary element (e.g. at least sixteen rows). Arrows illustrate the correspondence between particular columns of the ReRAM array 302 and corresponding 4×4 pixel matrix elements of the image dictionary. In particular, a column 304 of the array 302 stores the sixteen pixels of image element 306, whereas a column 308 of the array 302 stores the sixteen pixels of image element 310. As shown in the figure, each of the 4×4 pixel matrix elements consists of individual pixels having different grayscale levels. That is, some of the pixels are white, others are black, and still others are various shades of gray. Each of the 4×4 pixel matrices is different from the others. Likewise, as shown in the figure, individual cross-point elements of array 302 have different grayscale levels that correspond to corresponding pixels of the corresponding matrices. The various sizes and arrangements of the components are merely exemplary. The image dictionary 300 may have more or fewer elements, of greater or smaller size, and the ReRAM array 302 may have correspondingly more or fewer rows and columns. The image elements need not be square but might be, for example, rectangular. The ReRAM 302 may be configured to store a given image element within a row, rather than a column, and the designation of row vs. column is interchangeable. Still further, the ReRAM array 302 may have far more rows and columns than needed to store one image dictionary, with different portions of a large ReRAM array used to store the same (or different) dictionary of image elements within different portions of the larger array. As will be explained further, the same dictionary of image elements may be stored in parallel within a set of different ReRAM arrays or within different portions of a single ReRAM array to allow for parallel processing of image patches during training and compression.

In illustrative examples, images used for initial training and the images to be subsequently compressed are subdivided into patches of equal size and shape as the image elements. And so, in some examples, each of the set of image patches comprises a 4×4 array of sixteen pixels, the dictionary of image elements comprises thirty-two image elements, each image element comprising an 4×4 array of sixteen pixels, and the cross-point NVM array 302 is an 32×16 array comprising thirty-two columns, each of which includes sixteen cross-point resistance values, and the dictionary-based image compression circuit 123 (of FIG. 2) is configured to read out (or otherwise obtain) a column identifier value by reading out an index value n corresponding to one of the thirty-two columns. Using 32 columns for 4×4 input patch is a 2× overcomplete dictionary set (where "overcomplete," in this context, means there are more dictionary elements than the minimum needed to represent the observed data). In other examples, the individual image elements and patches each may be 5×5 or 8×8, rather than 4×4, with a larger total number of image elements, such as 50 or 128 or more, and with a correspondingly larger ReRAM array. More generally, in some examples, each of the set of image patches comprises an m×m array of M pixels, the dictionary of image elements comprises N image elements, with each image element comprising an m×m array of M pixels, and the cross-point NVM array 302 is an N×M array comprising N columns, each of which includes M cross-point resistance values, and the dictionary-based image compression circuit 123 is configured to read out a column identifier value from the cross-bar NVM array by reading out an index value n corresponding to one of the N columns.

Exemplary Training Procedures

Figure 4:
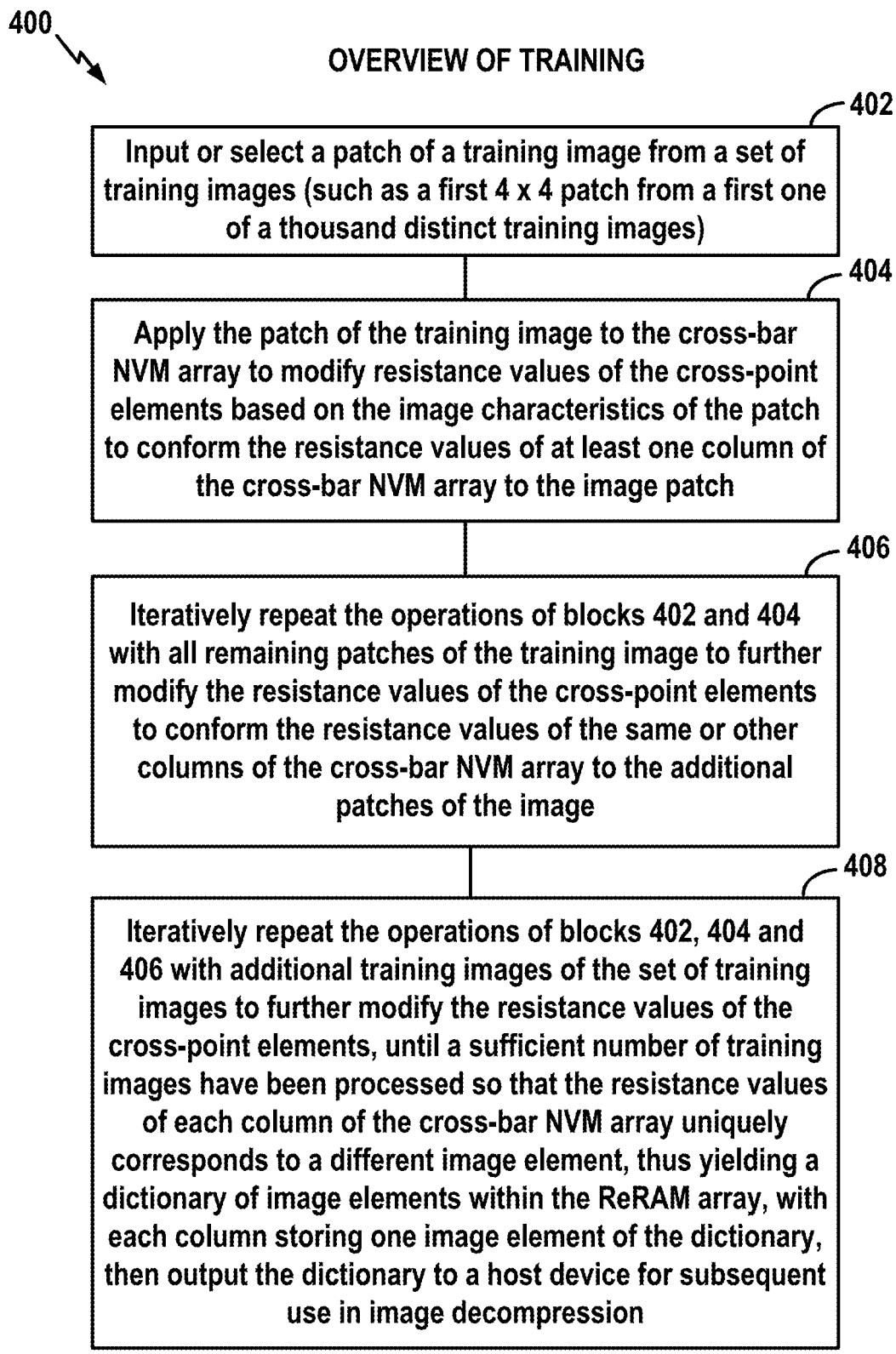
FIG. 4 is a flow chart providing an overview of a training procedure for configuring a cross-bar ReRAM to store an image dictionary for use in subsequent image compression.

FIG. 4 summarizes an exemplary training procedure 400 that may be used to generate a dictionary of image elements and store that dictionary in a ReRAM array. Beginning at block 402, a device equipped with a cross-bar ReRAM array inputs or selects a patch of a training image from a set of training images (such as a first 4×4 patch from a first one of a thousand distinct training images received from a host device). At block 404, the device applies the patch of the training image to the cross-bar NVM array to modify resistance values of the cross-point elements of the array based on the image characteristics of the patch to conform the resistance values of at least one column of the cross-bar NVM array to the image patch. By conform, it is meant that the resistance values are adjusted to more closely match or reflect image characteristic of the patch. Details of an exemplary procedure for conforming the resistance values to match characteristics of the image patch based on Hebbian learning are provided below. At block 406, the device iteratively repeats the operations of blocks 402 and 404 with all remaining patches of the training image to further modify the resistance values of the cross-point elements to conform the resistance values of the same or other columns of the cross-bar NVM array to the additional patches of the image. At block 408, the device iteratively repeats the operations of blocks 402, 404 and 406 with additional training images of the set of input training images to further modify the resistance values of the cross-point elements, until a sufficient number of training images have been processed so that the resistance values of each column of the cross-bar NVM array uniquely corresponds to a different image element, thus yielding a dictionary of image elements within the ReRAM array, with each column storing one image element of the dictionary, as already discussed. Further, within block 408, the device outputs the dictionary of image elements to a host device so that the host (or other devices) can ultimately decompress images compressed using the ReRAM area. The dictionary of image elements may be output as a list of the various final cross-point resistance values (which in turn represent the grayscale values of the pixels of the corresponding image elements in the dictionary) and their corresponding column and row indices, which the host stores, so that the host can thereafter decompress a compressed image by looking up the image elements and assembling a decompressed version of the image from the image elements.

The number of training images may vary but, for many practical applications, a thousand or so training images may suffice to generate a useful image dictionary that can thereafter be used for compressing other images (or at least other images that are of a type generally similar to the images used for training). A variety of methods may be used to determine when to end training. In some examples, a pre-determined fixed number of training images, e.g., one thousand is used. In other examples, the device is configured to determine when a sufficient number of training images have been used. For example, the device may be configured to assess an amount of change ($\Delta$) in the resistance values during each training image iteration. The amount of change is compared to a pre-determined change threshold. At the beginning of training, the resistance values are expected to change significantly with application of each new training image. After some larger number of training images has been applied, the resistance values are expected to stabilize or settle on final values. Hence, once the resistance values no longer change much with application of each new training image (e.g., the $\Delta$ is less than the threshold), the training may be deemed complete. Thereafter, additional training may be performed on demand, such as if it is found that subsequent image compression using the ReRAM is not as accurate as desired for particular applications.

If the device is intended to compress only facial images, the ReRAM may be trained using just input facial images. If the device is intended to compress images of inanimate objects, the ReRAM may be trained using a suitable set of inanimate object images. In other examples, if the device is intended to compress any possible input image, then a wider variety of images may be used for training. Additionally, a larger number of training images may be used to generate a larger image dictionary. For example, more training images may be used to generate a dictionary with 50 image elements, each composed of 5×5 patches, as opposed to a dictionary with 32 image elements, each composed of 4×4 patches. Still more training images may be used to generate a dictionary with 128 image elements, each composed of 8×8 patches.

Figure 5:
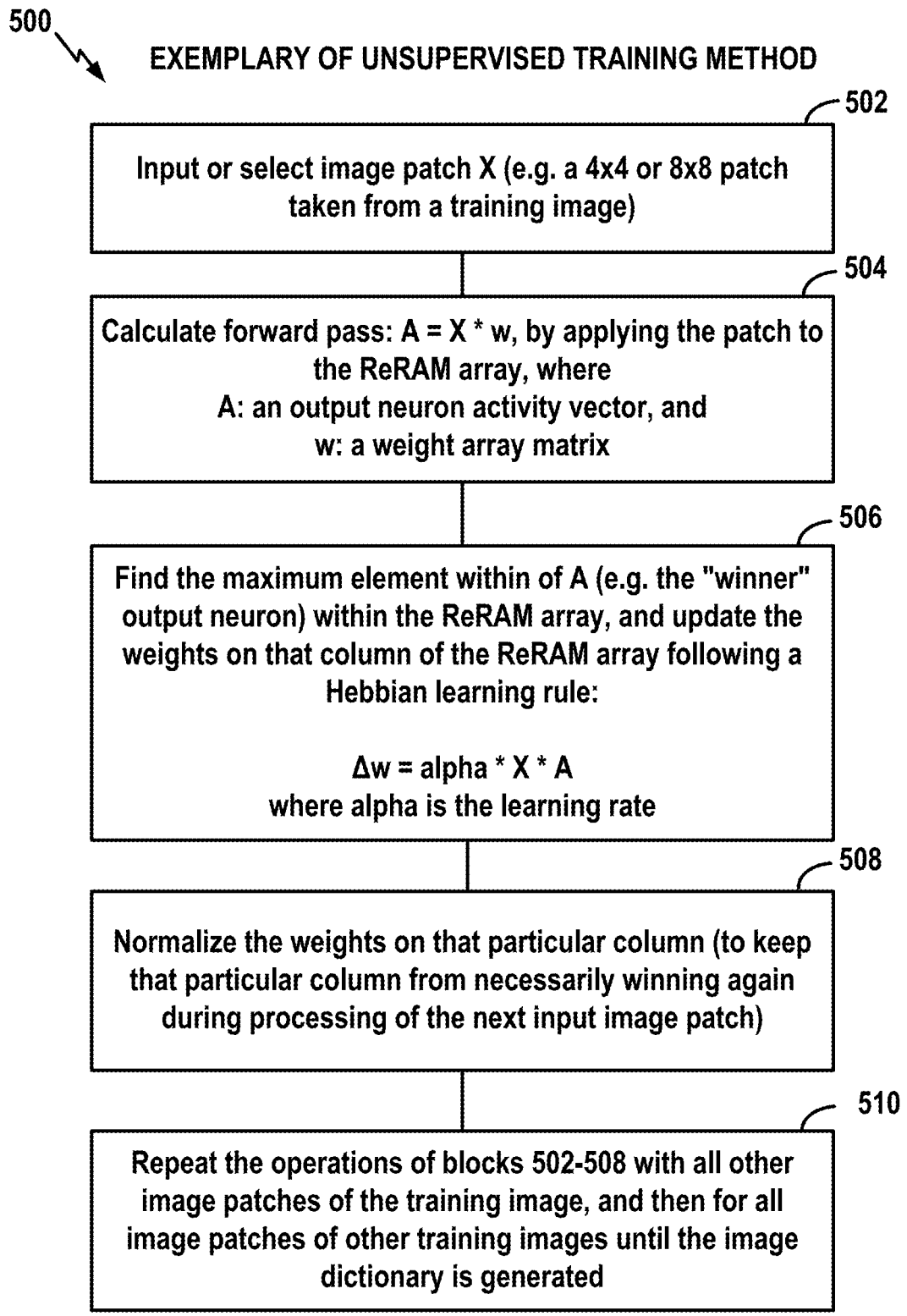
FIG. 5 is a flow chart providing an example of an unsupervised training procedure.

FIG. 5 illustrates an exemplary unsupervised training procedure 500 that may be used to generate a dictionary of image elements and store that dictionary in a ReRAM array. Beginning at block 502, a device equipped with a cross-bar ReRAM array inputs or selects an input image patch X (e.g. a 4×4 or 8×8 patch taken from a training image). At block 504, the device calculates a forward pass: A=X*w by applying the patch to the ReRAM array, where A is an output activity vector (which may be regarded as a neuron activity vector of deep neural network), and where w is a weight array matrix. For an example where X is a 4×4 matrix (i.e. sixteen values per X) and the image dictionary is intended to have thirty-two elements (for storage within a ReRAM array with at least thirty-columns), A is a sixteen element vector, and w is a 32×16 matrix, which represents the values of the cross-point resistance elements of the 32×16 cross-bar array. At block 506, the device finds the maximum element within of A (e.g. the "winner" output neuron) within the ReRAM array, and updates (adjusts) the weights on that particular column of the ReRAM array following a Hebbian learning rule: Δw=alpha*X*A, where alpha is a predetermined learning rate. Generally speaking, a Hebbian learning rule is a rule that specifies how much the weight of a connection between two neurons (or nodes or other elements) should be changed (increased or decreased) in proportion to the product of their activation. An alternative learning rule is the delta rule, which exploits a discrepancy between the desired and actual output of each neuron to change the weights feeding into it. At block 508, the device normalizes the weights on that particular column (to keep that particular from necessarily winning again during processing of the next input image patch). Depending upon the configuration, the calculations or operations of blocks 504-508 may be performed by circuit components formed within the ReRAM NVM die, or, in some examples, by components of the device controller (as discussed above). At block 510, the device repeats the operations of blocks 502-508 with all other image patches of the training image, and then for all image patches of all other training images until the image dictionary is generated and the cross-bar ReRAM array can be used for subsequent image compression.

Figure 6:
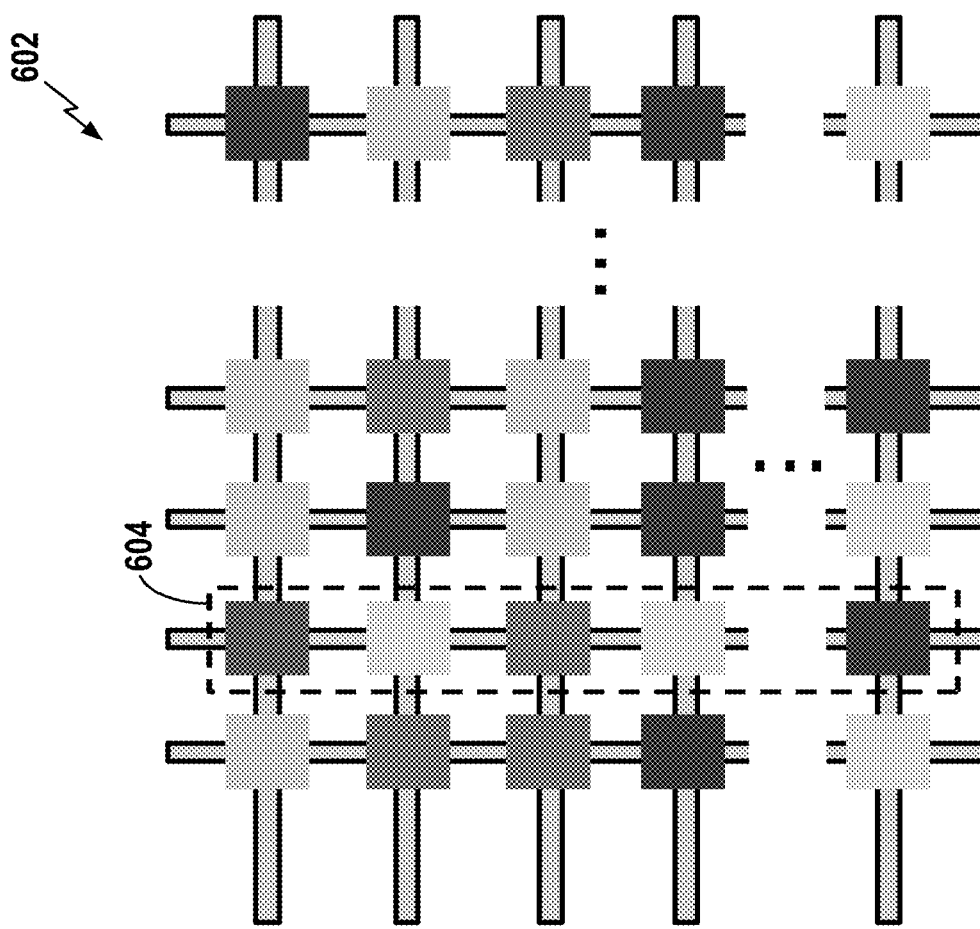
FIG. 6 is a block diagram of a cross-bar ReRAM array, highlighting a particular column of the array and the resistance values that may be programmed into that column.

FIG. 6 illustrates an exemplary ReRAM cross-bar array 602 showing an example where the winner neuron (e.g. winner column) is column 604, which, as already explained, corresponds to one element of an image dictionary. By "winner," it is meant that the values within that particular column correspond best to the image patch being processed, i.e. it is the closest match. Since it is the closest match, the value A for that particular column (i.e. the element with the vector A that corresponds to that particular column) has the largest value. In this particular example, the value is 0.5, which, as noted, is larger than the other values of A. As noted, only the "winner" neuron (e.g. the winning column) is updated as each image patch is processed. And so, in this example, only the cross-point resistance values of column 604 are updated based on the latest image patch (thus updating the image dictionary element that corresponds to, and is represented by, that column). By updating the resistance values of that particular column, the resistance values of that column tend to conform to the image patch so that the corresponding image dictionary element that is being generated by this procedure also tends to conform to the image patch. (As with the array of FIG. 3, individual cross-point elements of array 602 have different grayscale levels, some relatively light, others relatively dark, which represent the weights of the particular elements.)

In this manner, the image dictionary element represented by the resistance values of the winning column takes on the characteristics of the image patch. If the image patch represents a vertical edge within the training image, the pixel values represented by the updated column of the ReRAM array are thus adjusted to conform to a vertical edge. If the image patch represents a horizontal edge, the pixel values represented by the updated column of the ReRAM array are thus adjusted to conform to a horizontal edge. Eventually, following processing of all patches taken from a suitable number of training images, each of the columns of the ReRAM will have its resistance values adjusted to conform to a distinct image element within the image dictionary that is being generated. With thirty-two columns in the ReRAM array, a dictionary with thirty-two image elements is thereby generated, with each image element corresponding to a basic high-frequency or low-frequency feature within the training images. For many applications, thirty-two image elements (2× overcomplete dictionary) are sufficient for the purposes of subsequent image compression.

Note that the actual adjustment of the cross-point resistance values may be performed using otherwise conventional cross-point value programming procedures, which might depend on the particular configuration of the ReRAM. Note also that the ReRAM may be initially programmed with random resistance values within its rows and columns so that each column initially represents a randomly-generated dictionary image element. As training proceeds, each of the randomly-generated dictionary image elements will be iteratively adjusted based on the training images to conform to common components of the training images (e.g. vertical edges, horizontal edges, diagonal edges, etc.) so as to eventually generate a complete image dictionary.

Note also that the training procedures of FIGS. 4-6 may be performed at a remote site (e.g. "off-line") to determine the various resistance values, which are then programmed into the ReRAM array of a particular device, such as a particular mobile phone.

Exemplary Image Compression Procedures

Figure 7:
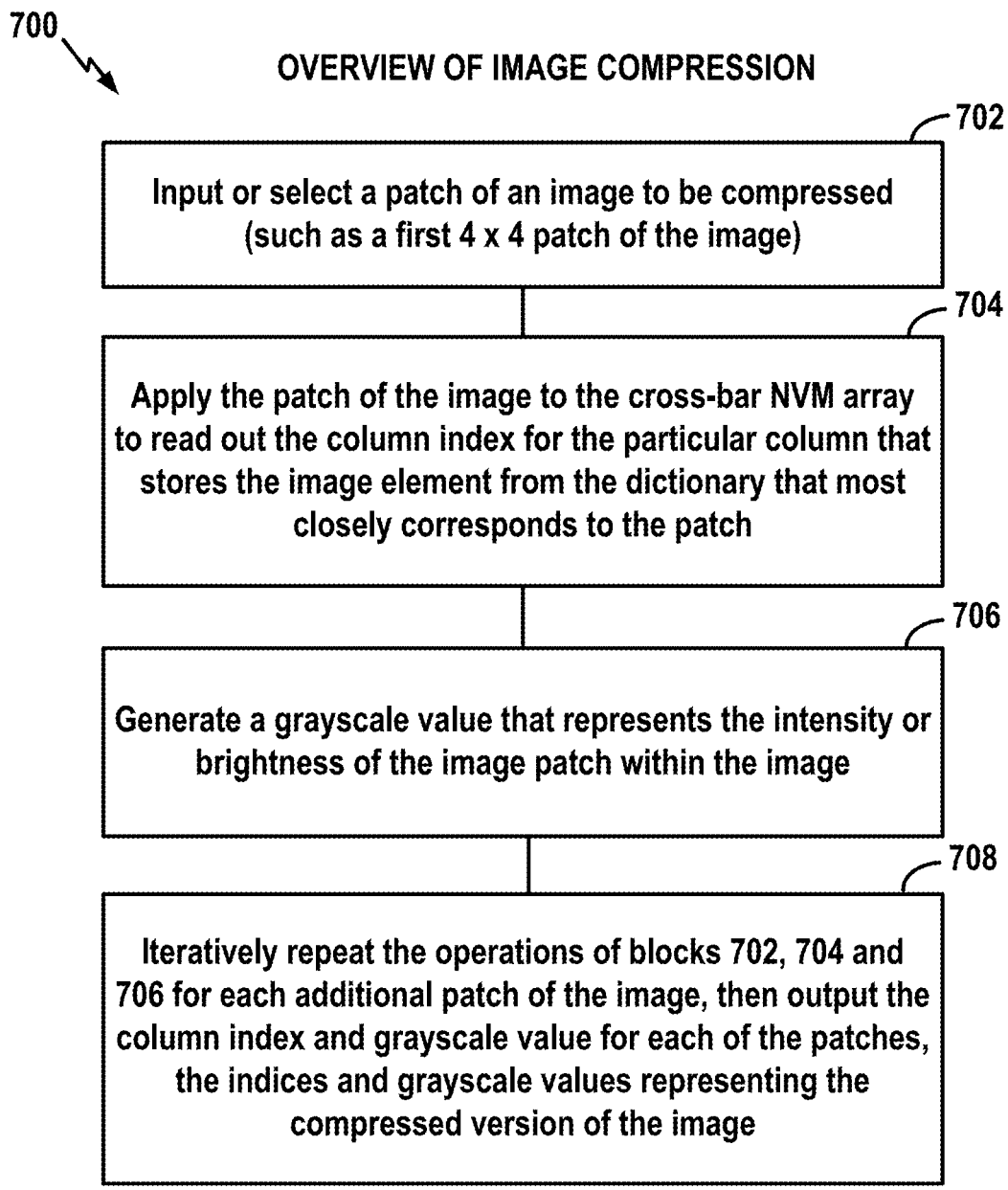
FIG. 7 is a flow chart providing an overview of an image compression procedure that uses a cross-bar ReRAM configured to store an image dictionary.

FIG. 7 summarizes an exemplary image compression training procedure 700 that may be used to compress an image using a ReRAM already configured to store a dictionary of image elements within its columns. Beginning at block 702, a device equipped with a cross-bar ReRAM array inputs or selects a patch of an image to be compressed (such as a first 4×4 patch of the image). At block 704, the device applies the patch of the image to the cross-bar NVM array to read out the column index for the particular column that stores the image element from the dictionary that most closely corresponds to the patch. At block 706, the device generates a grayscale coefficient value that represents the average intensity or brightness of the pixels in the particular image patch relative to other patches in the image. This may be done by determining the average brightness or intensity of the pixels in the image patch. At block 708, the device iteratively repeats the operations of blocks 702, 704 and 706 for each additional patch of the image, then outputs the column index and grayscale value for each of the patches, where the indices and grayscale values represent the compressed version of the image.

Figure 8:
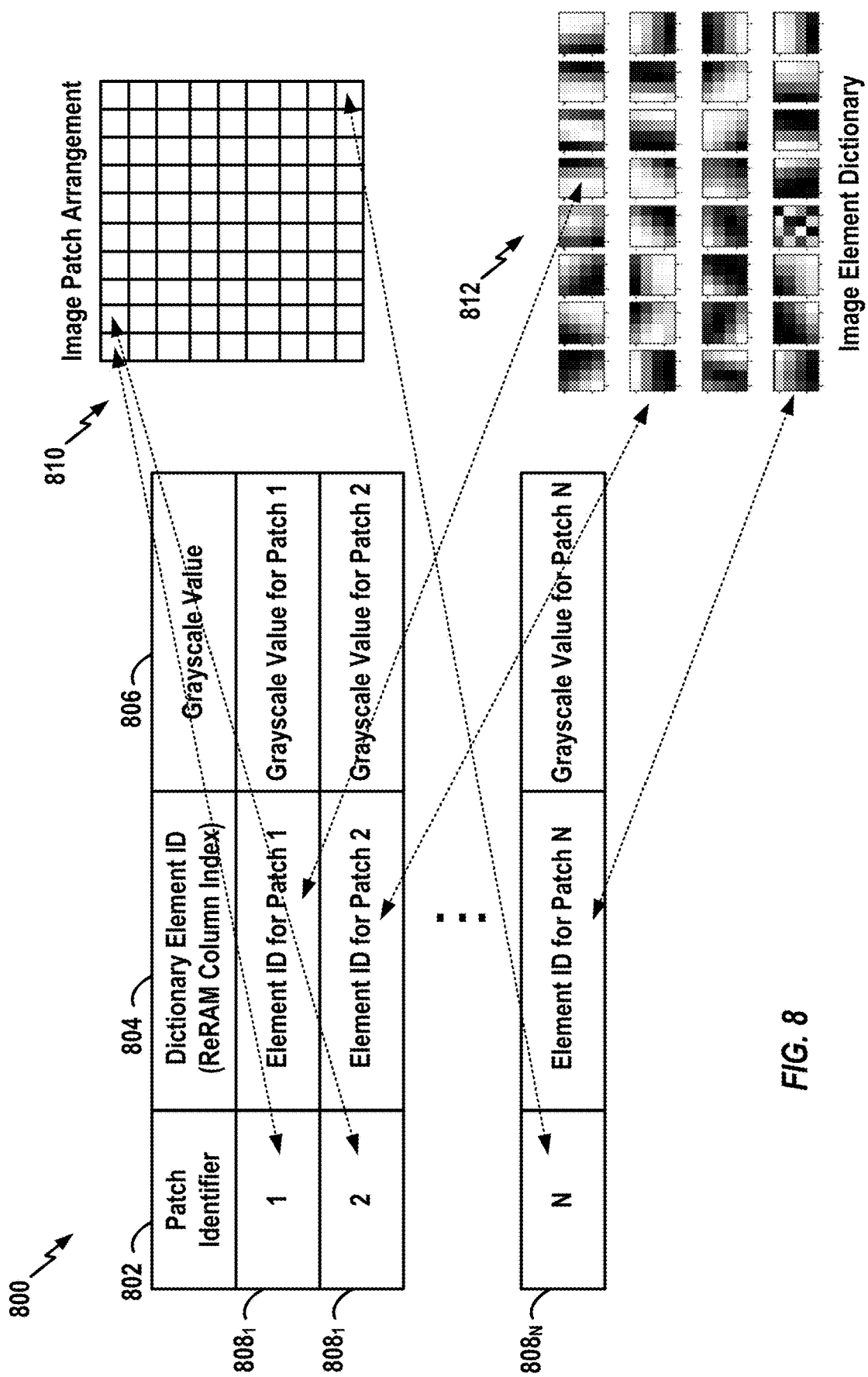
FIG. 8 is a block diagram of an image dictionary, an image patch arrangement, and a listing of elements of a compressed version of an image.

FIG. 8 illustrates an exemplary representation 800 of a compressed image. The compressed image is represented by a list of values for each patch of the image, including: a patch identifier, which may be a number from 1 to N where N is the total number of patches in the image; a dictionary element identifier, which may be the column index that identifies the column of the ReRAM array that stores the particular image element (e.g. a vertical edge, a horizontal edge, etc.); and a grayscale value for the patch. In the example of FIG. 8, the list includes one entry 808 per patch in the compressed image, in this case N patches, or $808_1$-$808_N$. FIG. 8 also illustrates an arrangement of image patches within an image and the correspondence of the various patch identifiers in the listing 800 to the patch locations within an image 810. Such parameters as the number of patches per image and their arrangement within an image (e.g. the number of rows and columns of patches in the image) may be preprogrammed into both the device and host. Still further, FIG. 8 illustrates an exemplary dictionary of image elements, with each element corresponding to a different 4×4 matrix of pixels (as determined during training). For an example where a 512×512 grayscale input image, having 8 bits per pixel, is compressed using 128 patches, the compressed version may then be a 128×128 image, with 5 bits for the grayscale coefficient and 5 bits to identify the location in the image dictionary. This corresponds to a compression ratio of about 12.8 to 1.

To decompress the image, a host device can then use the information in the list 800 to lookup the image elements from its stored version of the image dictionary 812 and assemble the dictionary elements in the proper two-dimensional arrangement of patches to recreate the image 810 while also applying the corresponding grayscale value for each particular patch. In FIG. 8, arrows show the correspondence between particular dictionary element IDs listed in the compressed version 800 of the image and the elements of dictionary 812. For each entry in listing 800, the host uses the dictionary element ID for that particular entry to look up the corresponding image element from dictionary 812 and then place that element into the appropriate patch location within the image arrangement 810 as indicated by the patch identifier (and while using the corresponding grayscale value to set the intensity for that particular patch). Once all N entries in the listing 800 are thus processed, the decompressed image will be represented within the two-dimensional array of the image 810 for display purposes or for other purposes.

Figure 9:
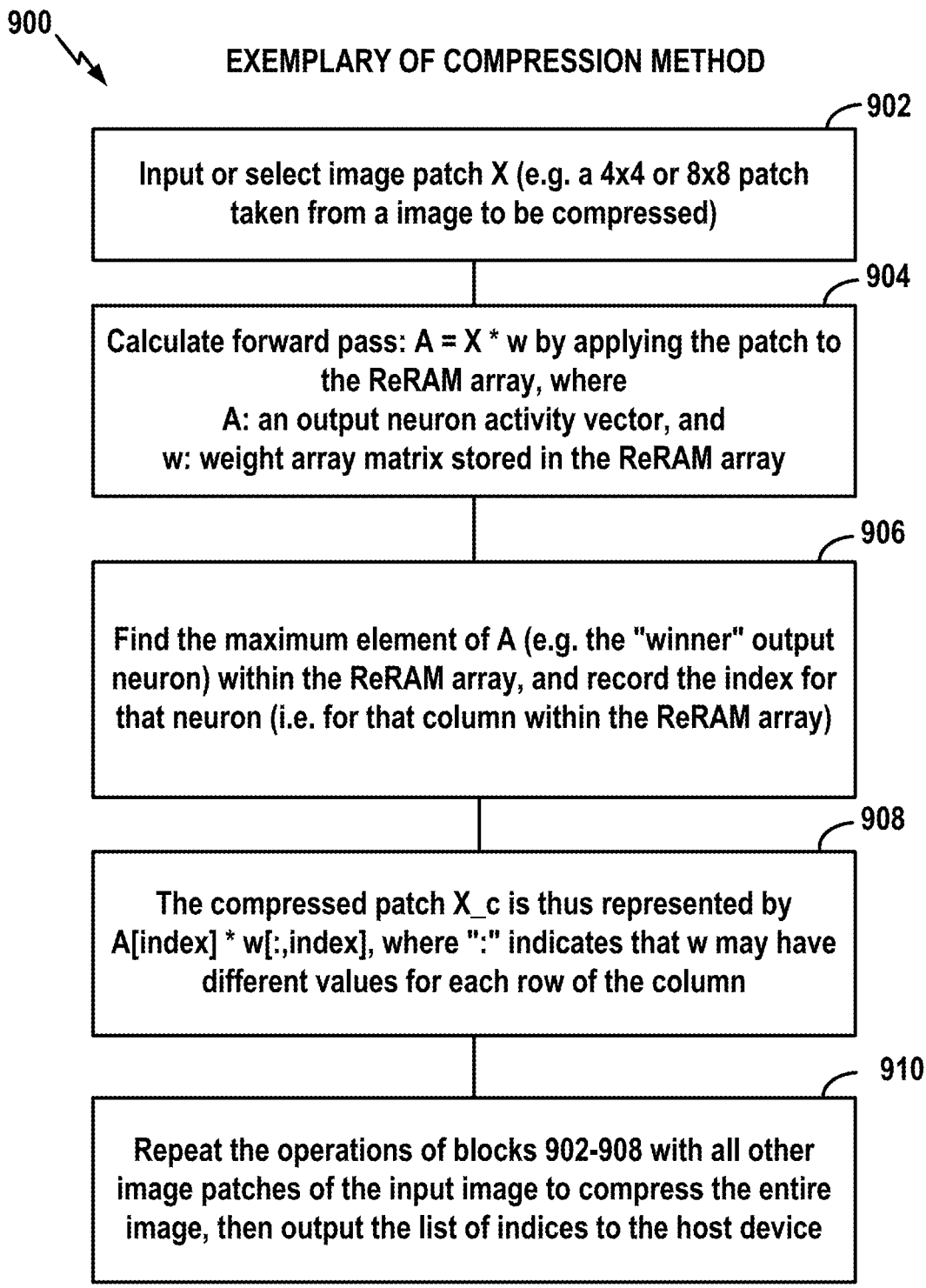
FIG. 9 is a flow chart providing an example of image compression using a cross-bar ReRAM array trained using the procedure of FIGS. 4-6.

FIG. 9 illustrates an exemplary compression procedure 900 for use if the cross-bar ReRAM array is configured using the training procedure of FIG. 5. Beginning at block 902, a device equipped with a suitably-trained cross-bar ReRAM array inputs or selects an input image patch X (e.g. a 4×4 or 8×8 patch taken from an image to be compressed). At block 904, the device calculates a forward pass: A=X*w by applying the patch to the ReRAM array, where A is an output activity vector, and where w is a weight array matrix.

At block 906, the device finds the maximum element within of A (e.g. the "winner" output neuron) within the ReRAM array, and records the index for that neuron (i.e. for that particular column within the ReRAM array). At block 908, the compressed patch X_c is thus represented by A[index] *w[:index], where ":" indicates that w may have different values for each row of the column (and so A is a vector having one entry for each row in the column, so as to provide values for each of the pixels of the patch, which may be a 4×4 matrix). At block 910, the device repeats the operations of blocks 902-908 for all other patches of the image to compress the entire image, then outputs the list of indices to the host device (in the form, for example, shown in FIG. 8).

Figure 10:
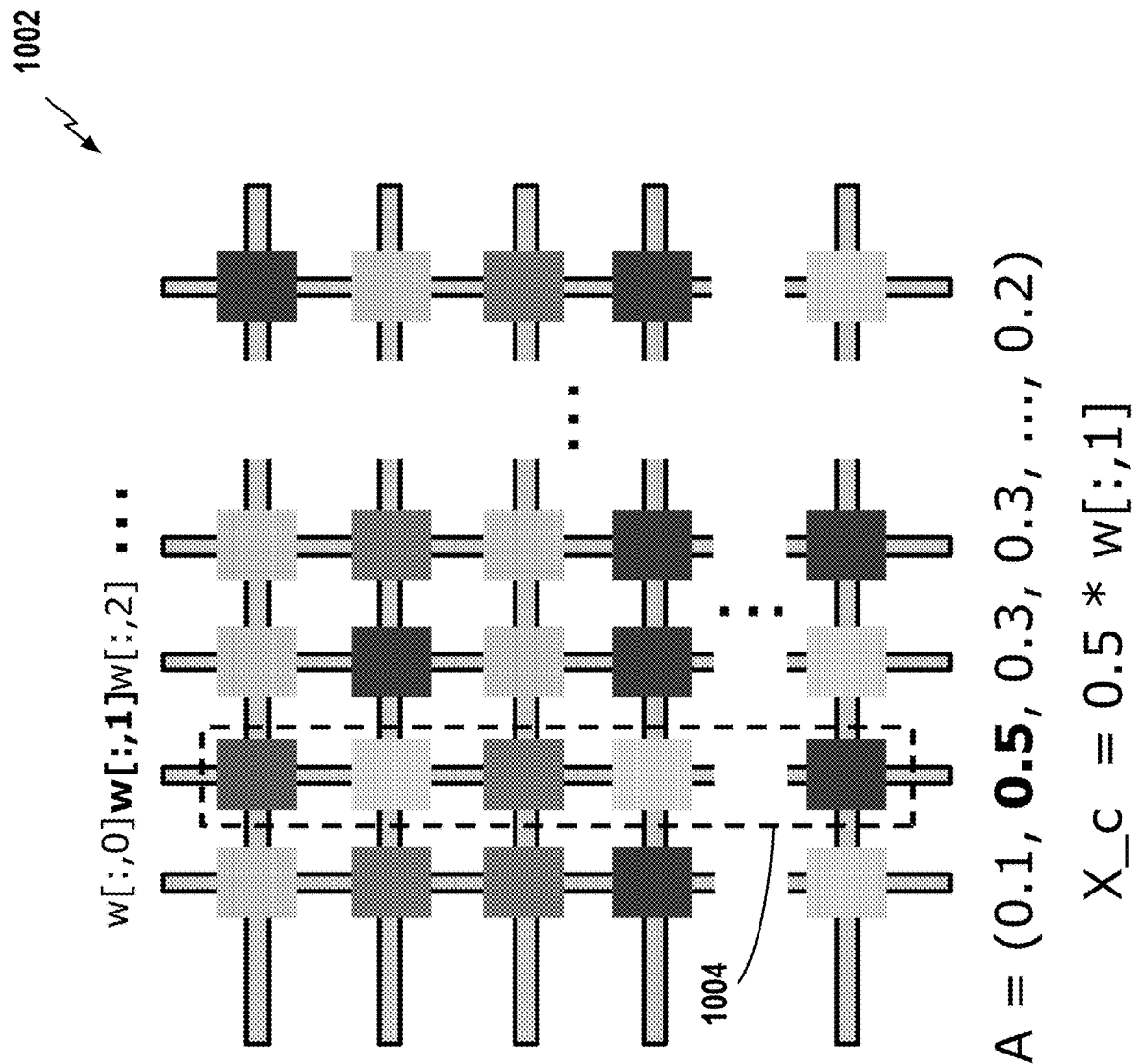
FIG. 10 is a block diagram of a cross-bar ReRAM array, highlighting a particular column of the array and the resistance values that may be retrieved from that column.

FIG. 10 again illustrates an exemplary ReRAM cross-bar array 1002 showing an example where the winner neuron (e.g. winner column) during decompression is column 1004, which has an index value of 1 (where the indices in this example, run from 0 . . . n). By "winner," it is again meant that the values within that particular column, i.e. column [:1], correspond best to the image patch being processed, i.e. it is the closest match. Since it is the closest match, the value A for that particular column (i.e. the element with the vector A that corresponds to that particular column) has the largest value. In this particular example, the value is again 0.5, which, as shown, is larger than the other values within A. As noted, the compressed patch X_c is represented by A[index] *w[:index], and, in this particular example, X_c=0.5*w[:,1]. For other patches within the image, other columns will provide the closest match, and so different X_c values will be read out. Each patch is processed in this manner to compress the entire image. (As with the array of FIG. 3, individual cross-point elements of array 1002 of FIG. 10 have different grayscale levels, some relatively light, others relatively dark, which represent the weights of particular elements.)

Figure 11:
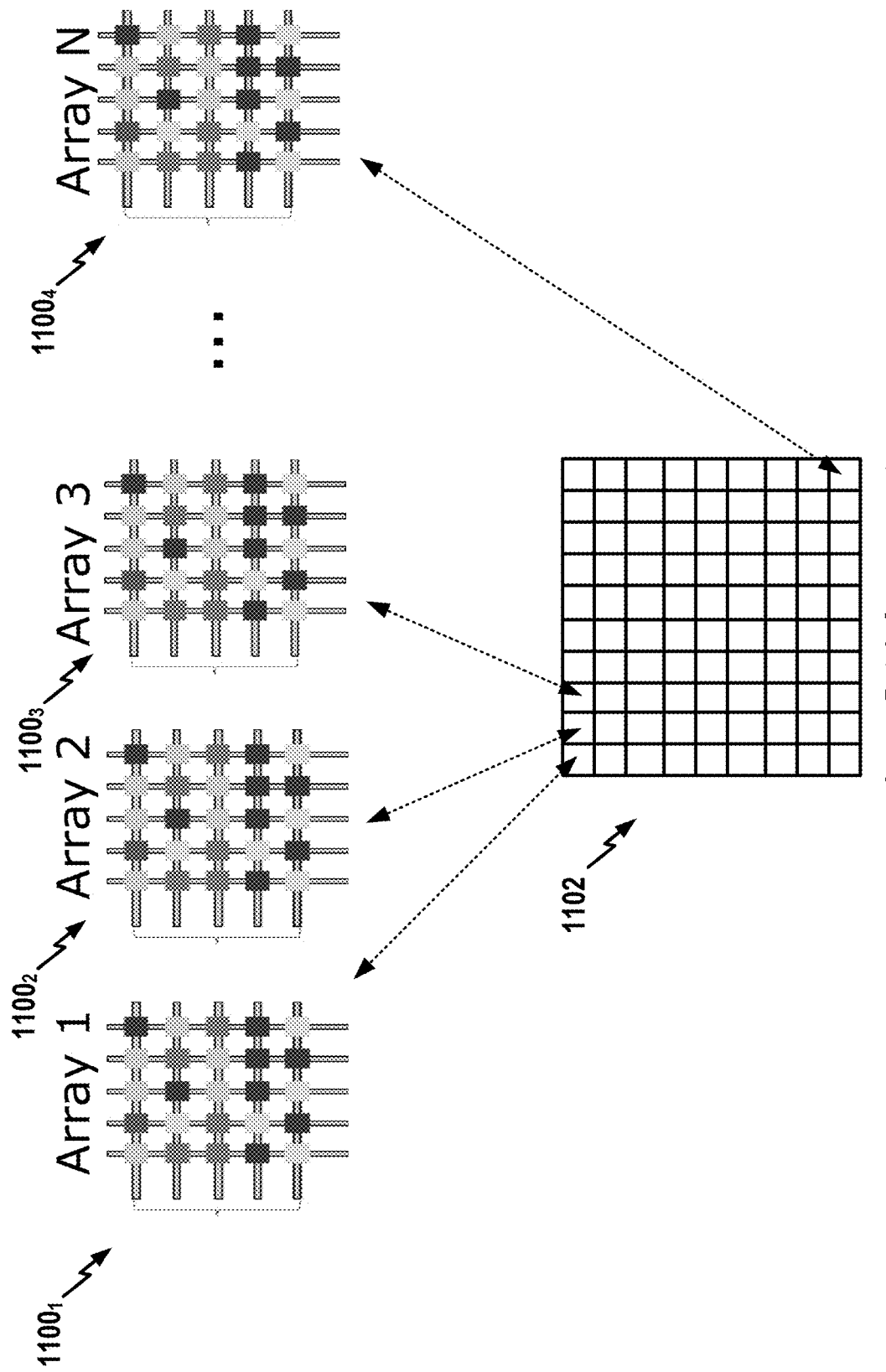
FIG. 11 is a block diagram of a set of cross-bar ReRAM arrays that may be accessed in parallel.

FIG. 11 illustrates an arrangement where the ReRAM include a set of N cross-bar arrays $1100_1$-$1100_N$, each programmed (or trained) to store the same resistance values, so that the N patches of an image 1102 can be compressed in parallel. To program the arrays, the training procedure of FIG. 4-6 may be performed on one of the arrays, with the final resistance values then programmed into the other arrays, so each stores the same values (and hence each stores the same dictionary of image elements). Alternatively, the arrays may be programmed by performing the training to apply each patch of each training image to each array in parallel, so that each array again is configured to store the same the same values (and hence each stores the same dictionary of image elements). In other implementations, though, it may be useful to separately train the cross-bar arrays so each stores a different set of dictionary elements. If so, the host should be provided with the different sets of dictionary elements, so that the host can properly decompress images that have been compressed with the different arrays. Note also that the illustration of FIG. 11 shows only a portion of each individual array, which, as already explained, can be larger to accommodate more rows and columns of weight values. Also, as with the array of FIG. 3, individual cross-point elements of the arrays 1100 of FIG. 11 have different grayscale levels, some relatively light, others relatively dark, which represent the weights of particular elements.

In some illustrative examples, by using the methods and apparatus described herein, power and space savings can be achieved relative to conventional image compression methods and apparatus. In one example, based on modelling, it is anticipated that a compression throughput of 79,000

MB/second can be achieved, while consuming only 25.6 mW of power and while using a core area of only 4.6 k μm², and with a compression ratio of 12.8 to 1, and a peak signal to noise ratio of 23, for a 4×4 patch-sized example.

Note that, although described primarily with reference to the compression of two-dimensional images, aspects of the method and apparatus described herein may be applicable, with suitable adjustments, to compressing one-dimensional data fields, or three-dimensional or higher-dimensional data fields. Still further, the two-dimensional images may each represent one frame of a video, and so the procedures herein provide for video compression.

Exemplary Method Embodiments

Figure 12:
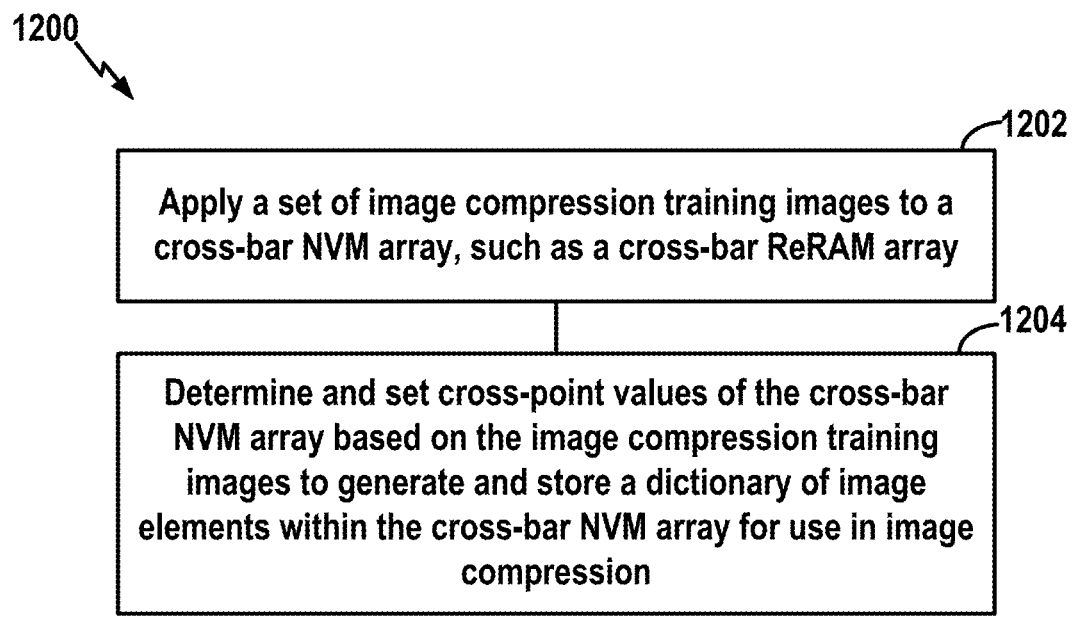
FIG. 12 is a flow chart summarizing a general exemplary method for image dictionary training and generation.

FIG. 12 illustrates an exemplary flowchart 1200 according one aspect of the present disclosure. The method 1200 includes, as shown at block 1202, applying a set of image compression training images to the cross-bar NVM array, as shown at block 1204, determining and setting (e.g. configuring) cross-point values of the cross-bar NVM array based on the image compression training images to generate and store a dictionary of image elements within the cross-bar NVM array for use in image compression. By "image compression training images," it is meant that the training images are suitable for use in generating a dictionary of images for later use in image compression. As can be appreciated, a set of training images that are all more or less similar to one another would not be well-suited for generating an image dictionary for use in general image compression. Conversely, a set of training images that have the visual characteristics of the sort of images that later will be compressed would instead provide a suitable set of training images for image compression. Hence, the particular images used for training may depend on the particular application that the NVM device will be used for. If the device is primarily intended to compress images of faces, then a suitable set of image compression training images would include a variety of facial images. Details of exemplary implementations for generating and storing images dictionaries are described above, where the operations are performed by, for example, the controller of a device that communicates with the NVM or by components of the NVM die itself.

Figure 13:
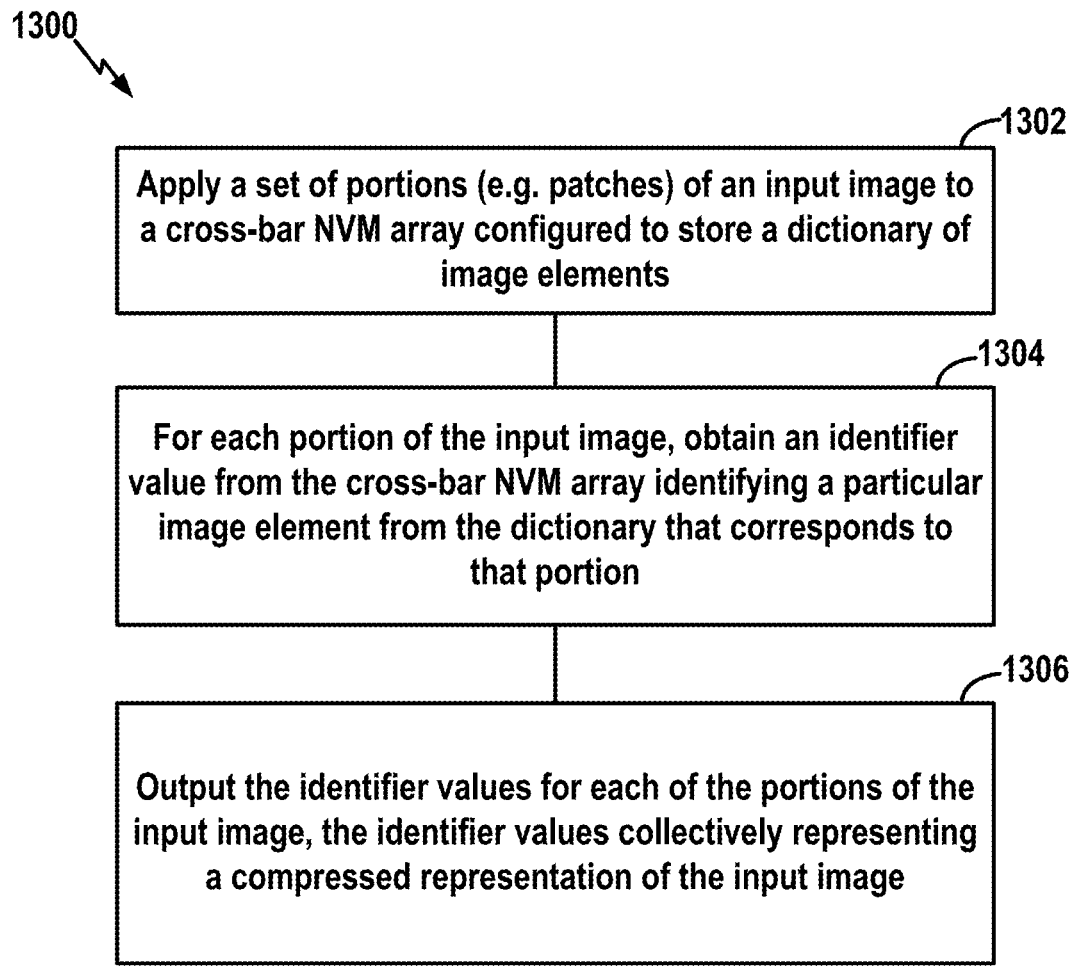
FIG. 13 is a flow chart summarizing a general exemplary method for image compression.

FIG. 13 illustrates an exemplary flowchart 1300 another aspect of the present disclosure. The method 1300 includes, as shown at block 1302, applying a set of portions (e.g. patches) of an input image to a cross-bar NVM array configured to store a dictionary of image elements and, as shown at block 1304, for each portion of the input image, obtaining (e.g. reading out) an identifier value from the cross-bar NVM array identifying a particular image element from the dictionary that corresponds to that portion. Still further, as shown at block 1304, the method includes outputting the identifier values for each of the portions of the input image, the identifier values collectively representing a compressed representation of the input image. Details of exemplary implementations are described above, where the operations are performed by, for example, the controller of a device that communicates with the NVM or by components of the NVM die itself.

Exemplary Apparatus Embodiments

Figure 14:
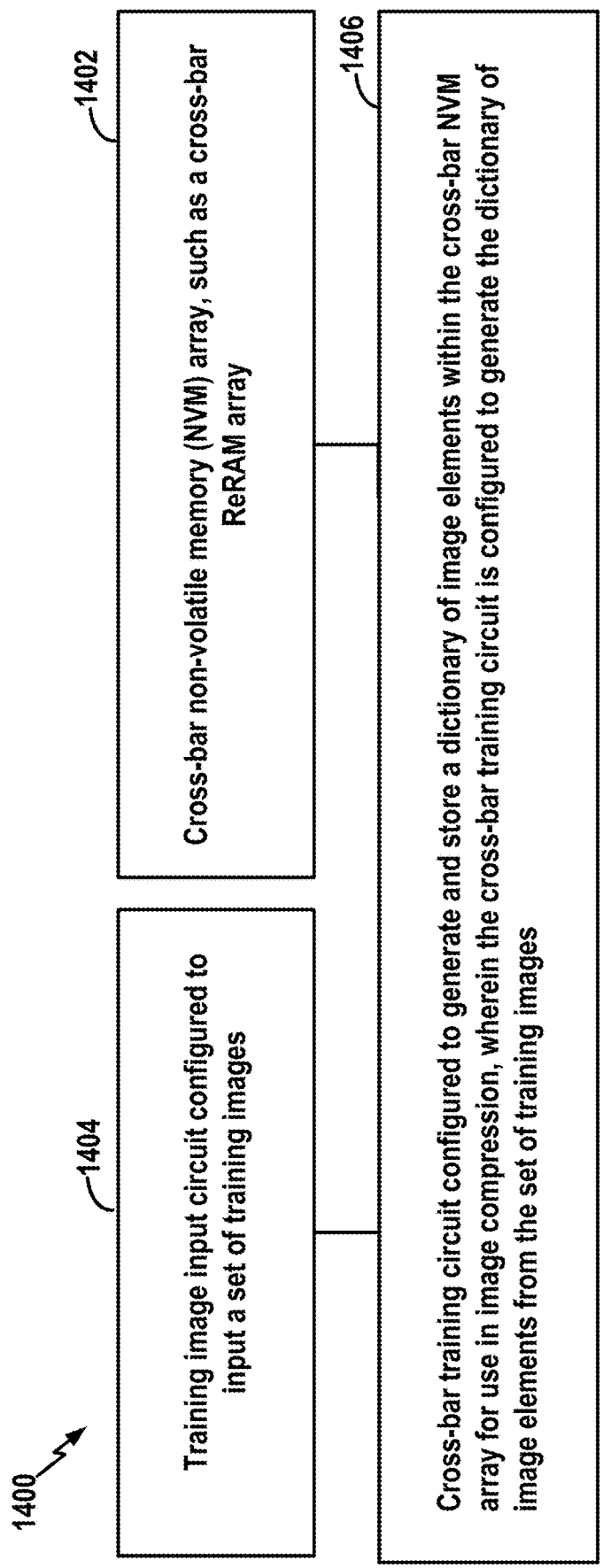
FIG. 14 is a block diagram of an exemplary device having training components.

FIG. 14 illustrates an exemplary device or apparatus 1400 configured according to an aspect of the disclosure herein. The apparatus 1400 includes, as shown by block 1402, a cross-bar NVM array, such as a cross-bar ReRAM array, and also includes, as shown by block 1404, a training image input circuit configured to input a set of training images. The apparatus also includes, as shown by block 1406, a cross-bar training circuit configured to generate and store a dictionary of image elements within the NVM array for use in image compression, wherein the cross-bar training circuit is configured to generate the dictionary of image elements from the set of training images. Details of exemplary implementations are described above, where training circuit 1406 may be, for example, a component of the controller of a device that communicates with the NVM or a component of the NVM die itself.

Figure 15:
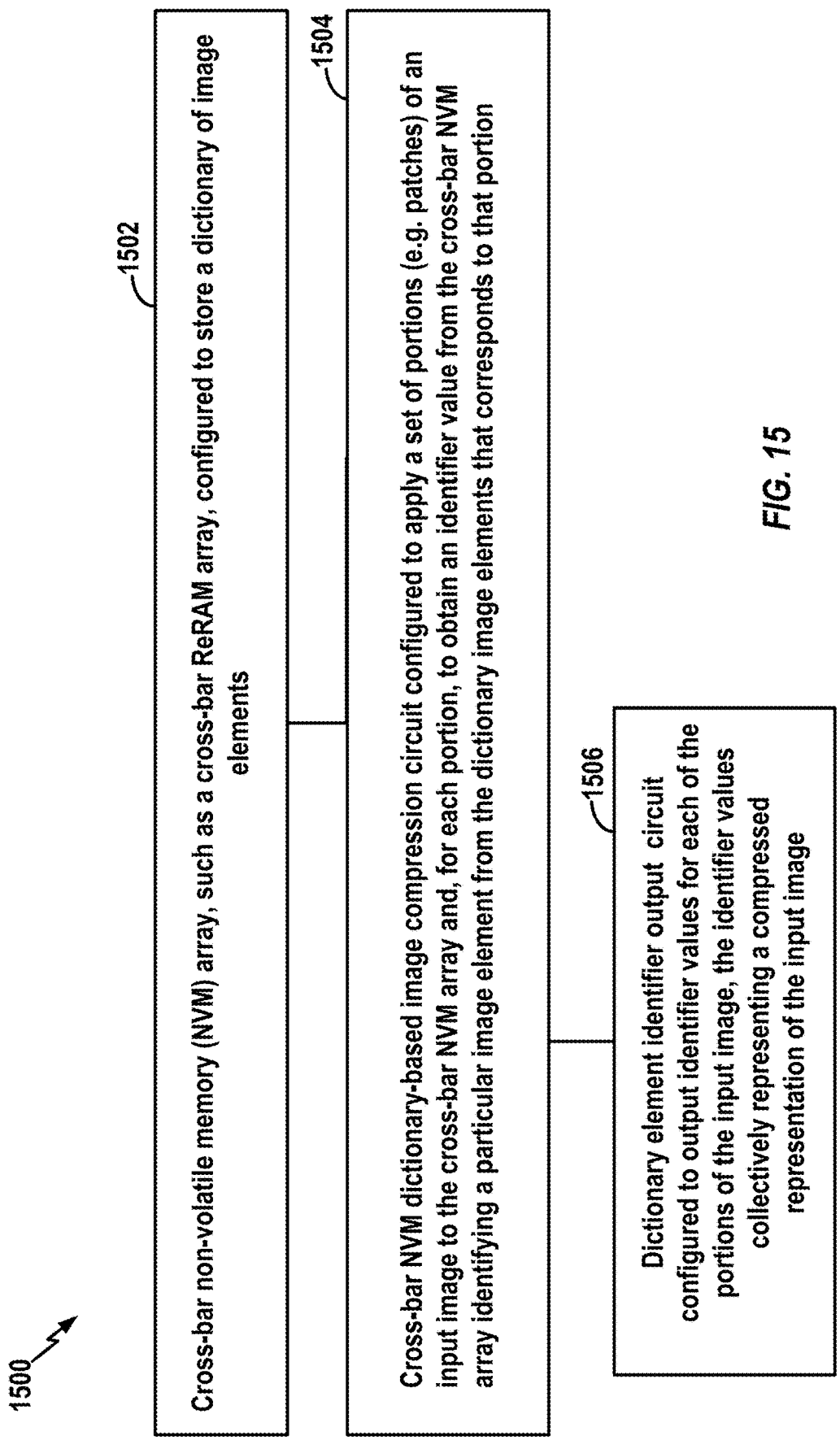
FIG. 15 is a block diagram of an exemplary device having image compression components.

FIG. 15 illustrates an exemplary device or apparatus 1500 configured according to another aspect of the disclosure herein. The apparatus 1500 includes, as shown by block 1502, a cross-bar NVM array, such as a cross-bar ReRAM array, that has been configured to store a dictionary of image elements. The apparatus also includes a cross-bar NVM dictionary-based image compression circuit 1504 configured to (a) apply a set of portions (e.g. patches) of an input image to the cross-bar NVM array and, for each portion, to (b) obtain (e.g. read out) an identifier value from the cross-bar NVM array identifying a particular image element from the dictionary image elements that corresponds to that portion. The apparatus further includes a dictionary element identifier output circuit 1506 configured to output the identifier values for each of the portions of the input image, the identifier values collectively representing a compressed version of the input image. Details of exemplary implementations are described above, where compression circuit 1504 may be, for example, a component of the controller of a device that communicates with the NVM or a component of the NVM die itself.

Figure 16:
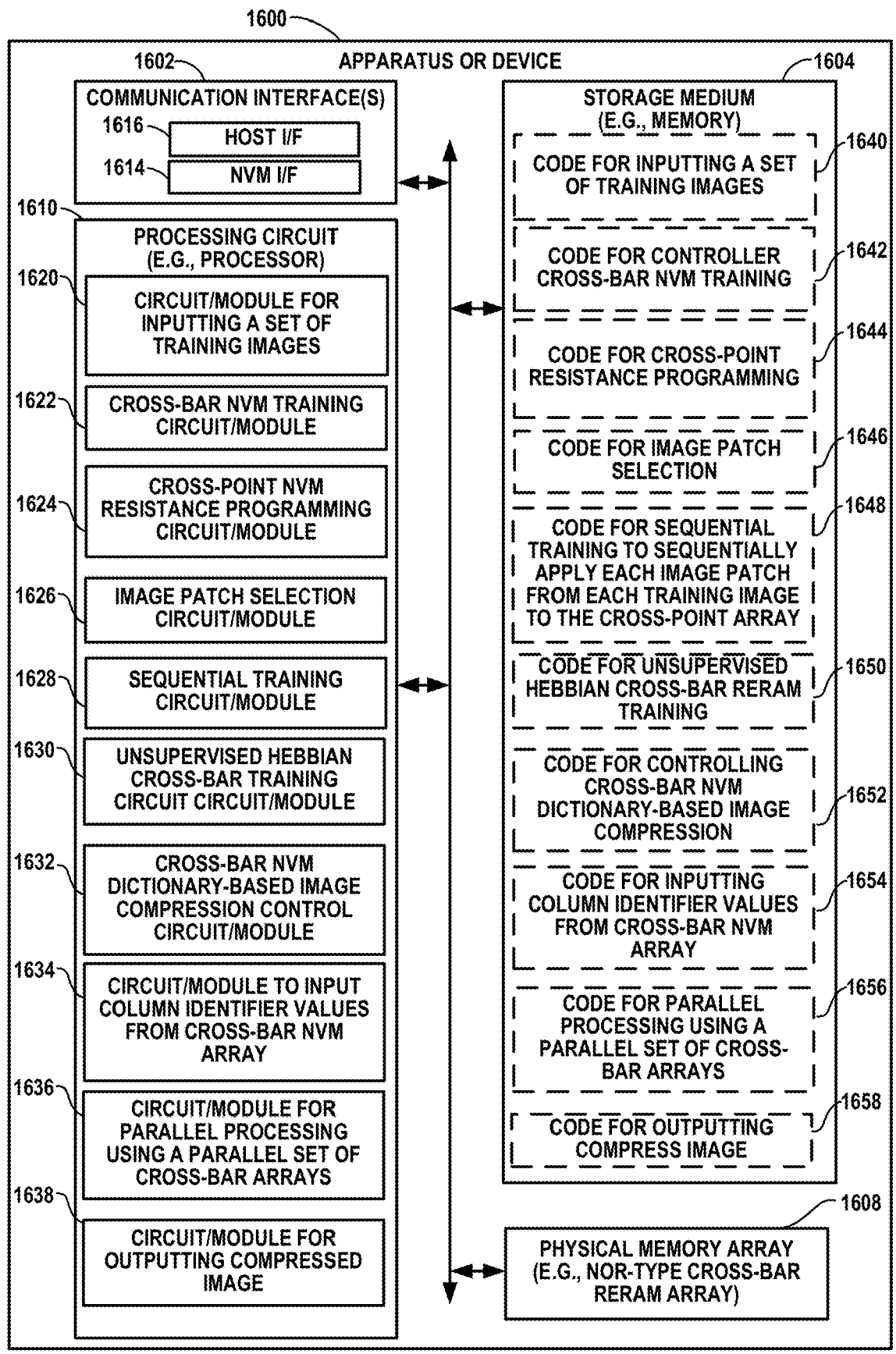
FIG. 16 illustrates an example of a device (e.g., a controller), particularly highlighting exemplary components for training and image compression.

FIG. 16 illustrates an embodiment of a device or apparatus 1600 that provides additional exemplary detail and is configured according to one or more aspects of the disclosure. The apparatus 1600, or components thereof, could embody or be implemented within a device controller, a host device, an NVM device, a ReRAM die, a solid state device (SSD), a data storage apparatus, or some other type of device. In various implementations, the apparatus 1600, or components thereof, could embody or be implemented within a computing device, a personal computer, a portable device, or workstation, a server, a personal digital assistant, a digital camera, a digital phone, an entertainment device, a medical device, or any other electronic device, including IoT devices.

The apparatus 1600 includes a communication interface 1602, a storage medium 1604, a physical memory array (e.g., a NOR-type cross-bar ReRAM memory circuit) 1608, and a processing circuit 1610 (e.g., at least one processor and/or other suitable circuitry). These components can be coupled to and/or placed in electrical communication with one another via a signaling bus or other suitable component, represented generally by the connection lines in FIG. 16. The signaling bus may include any number of interconnecting buses and bridges depending on the specific application of the processing circuit 1610 and the overall design constraints. The signaling bus links together various circuits such that each of the communication interface 1602, the storage medium 1604, and the memory array 1608 are coupled to and/or in electrical communication with the processing circuit 1610. The signaling bus may also link various other circuits (not shown) such as timing sources, peripherals, voltage regulators, and power management circuits, which are well known in the art, and will not be described any further.

The communication interface 1602 provides a means for communicating with other apparatuses over a transmission medium. In some implementations, the communication interface 1602 includes circuitry and/or programming (e.g., a program) adapted to facilitate the communication of information bi-directionally with respect to one or more devices in a system. In some implementations, the communication interface 1602 may be configured for wire-based communication. For example, the communication interface 1602 could be a bus interface, a send/receive interface, or some other type of signal interface including drivers, buffers, or other circuitry for outputting and/or obtaining signals (e.g., outputting signal from and/or receiving signals into an integrated circuit). The communication interface 1602 serves as one example of a means for receiving and/or a means for transmitting.

The physical memory array 1608 may represent one or more cross-bar ReRAM arrays. In some implementations, the memory array 1608 and the storage medium 1604 are implemented as a common memory component. The memory array 1608 may be used for storing data that is manipulated by the processing circuit 1610 or some other component of the apparatus 1600. In the example of FIG. 16, the memory array 1608 may include ReRAM or other suitable cross-bar arrays adapted for storing image dictionary elements, as already explained.

The storage medium 1604 may represent one or more computer-readable, machine-readable, and/or processor-readable devices for storing programming, such as processor executable code or instructions (e.g., software, firmware), electronic data, databases, or other digital information. The storage medium 1604 may also be used for storing data that is manipulated by the processing circuit 1610 when executing programming. The storage medium 1604 may be any available media that can be accessed by a general purpose or special purpose processor, including portable or fixed storage devices, optical storage devices, and various other mediums capable of storing, containing or carrying programming.

By way of example and not limitation, the storage medium 1604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 1604 may be embodied in an article of manufacture (e.g., a computer program product). By way of example, a computer program product may include a computer-readable medium in packaging materials. In view of the above, in some implementations, the storage medium 1604 may be a non-transitory (e.g., tangible) storage medium. For example, the storage medium 1604 may be a non-transitory computer-readable medium storing computer-executable code, including code to perform operations as described herein.

The storage medium 1604 may be coupled to the processing circuit 1610 such that the processing circuit 1610 can read information from, and write information to, the storage medium 1604. That is, the storage medium 1604 can be coupled to the processing circuit 1610 so that the storage medium 1604 is at least accessible by the processing circuit 1610, including examples where at least one storage medium is integral to the processing circuit 1610 and/or examples where at least one storage medium is separate from the processing circuit 1610 (e.g., resident in the apparatus 1600, external to the apparatus 1600, distributed across multiple entities, etc.).

Programming stored by the storage medium 1604, when executed by the processing circuit 1610, causes the processing circuit 1610 to perform one or more of the various functions and/or process operations described herein. For example, the storage medium 1604 may include operations configured for regulating operations at one or more hardware blocks of the processing circuit 1610, as well as to utilize the communication interface 1602 for wireless communication utilizing their respective communication protocols.

The processing circuit 1610 is generally adapted for processing, including the execution of such programming stored on the storage medium 1604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1610 is arranged to obtain, process and/or send data, control data access and storage, issue commands, and control other desired operations. The processing circuit 1610 may include circuitry configured to implement desired programming provided by appropriate media in at least one example. For example, the processing circuit 1610 may be implemented as one or more processors, one or more controllers, and/or other structure configured to execute executable programming. Examples of the processing circuit 1610 may include a general purpose processor, a DSP, an ASIC, an FPGA, or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1610 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 1610 are for illustration and other suitable configurations within the scope of the disclosure are also contemplated.

According to one or more aspects of the disclosure, the processing circuit 1610 may be adapted to perform any or all of the features, processes, functions, operations and/or routines for any or all of the apparatuses described herein. For example, the processing circuit 1610 may be configured to perform the steps, functions, and/or processes described with respect to FIGS. 1-15. As used herein, the term "adapted" in relation to the processing circuit 1610 may refer to the processing circuit 1610 being one or more of configured, employed, implemented, and/or programmed to perform a particular process, function, operation and/or routine according to various features described herein. The processing circuit 1610 may be a specialized processor, such as an ASIC that serves as a means for (e.g., structure for) carrying out any one of the operations described in conjunction with FIGS. 1-15 or FIG. 18, discussed below. The processing circuit 1610 serves as one example of a means for sending and/or a means for receiving. In various implementations, the processing circuit 1610 may provide and/or incorporate, at least in part, the functionality described above for the controller 104 of FIG. 1.

According to at least one example of the apparatus 1600, the processing circuit 1610 may include one or more of: a circuit/module 1620 configured for inputting a set of training images for applying to cross-bar NVM array 1608; a cross-bar training circuit/module 1622 configured for applying the set of training images to the cross-bar NVM array to determine and set (e.g. configure) the cross-point values of the cross-bar NVM array based on the training images to generate and store a dictionary of image elements within the NVM array; a cross-point NVM resistance programming circuit/module 1624 configured for setting the cross-point resistance values of the cross-bar NVM array to store individual elements of the dictionary of image elements within individual columns of the cross-bar NVM array; an image patch selection circuit/module 1626 configured to select a set of image patches from within each of the set of training images; a sequential training circuit/module 1628 configured to sequentially apply each of the set of image patches from each of the set of training images to the cross-point NVM array to iteratively configure the cross-point resistance values to generate and store the dictionary of image elements; an unsupervised Hebbian cross-bar training circuit/module 1630 configured to set the cross-point resistance values of the cross-bar NVM array using an unsupervised training procedure, such as a Hebbian procedure; a cross-bar NVM dictionary-based image compression circuit/module 1632 configured to apply a set of portions/patches of an input image to the cross-bar NVM array and, for each portion/patch, to obtain (e.g. read out) an identifier value from the cross-bar NVM array identifying a particular image element from the dictionary image elements that corresponds to that portion/patch; a circuit/module 1634 configured to input column identifier values for each of the portions/patches of the input image from the cross-bar array, the identifier values collectively representing a compressed version of the input image; a circuit/module 1636 configured for controlling parallel image processing using a parallel set of cross-bar arrays; and a circuit/module 1638 configured for outputting a compressed image. Note that the unsupervised Hebbian cross-bar training circuit/module 1630 may use a learning rule such as: $\Delta w=alpha*X*A$, where alpha is a predetermined learning rate.

As mentioned above, a program stored by the storage medium 1604, when executed by the processing circuit 1610, causes the processing circuit 1610 to perform one or more of the various functions and/or process operations described herein. For example, the program may cause the processing circuit 1610 to perform the various functions, steps, and/or processes described herein with respect to FIGS. 1-15 in various implementations. As shown in FIG. 16, the storage medium 1604 may include one or more of: code 1640 for inputting a set of training images; code 1642 for controller cross-bar NVM training; code 1644 for cross-point resistance programming; code 1646 for image patch selection; code 1648 for sequential training to sequentially apply each image patch from each training image to the cross-point array; code 1650 for unsupervised Hebbian cross-bar ReRAM training; code 1652 for controlling cross-bar NVM dictionary-based image compression; code 1654 for code for inputting identifier values from cross-bar NVM array; code 1656 for parallel processing using a parallel set of cross-bar arrays; and code 1658 for outputting a compressed image.

In at least some examples, means may be provided for performing the functions illustrated in FIG. 16 and/or other functions illustrated or described herein. For example, the means may include one or more of: means, such as circuit/module 1620, for inputting a set of training images for applying to cross-bar NVM array; means, such as circuit/module 1622, for applying the set of training images to the cross-bar NVM array to determine and set (e.g. configure) the cross-point values of the cross-bar NVM array based on the training images to generate and store a dictionary of image elements within the NVM array; means, such as circuit/module 1624, for setting the cross-point resistance values of the cross-bar NVM array to store individual elements of the dictionary of image elements within individual columns of the cross-bar NVM array; means, such as circuit/module 1626, for selecting a set of image patches from within each of the set of training images; means, such as circuit/module 1628, for sequentially applying each of the set of image patches from each of the set of training images to the cross-point NVM array to iteratively configure the cross-point resistance values to generate and store the dictionary of image elements; means, such as circuit/module 1630, for setting the cross-point resistance values of the cross-bar NVM array using an unsupervised training procedure, such as a Hebbian procedure; means, such as circuit/module 1632, for applying a set of portions/patches of an input image to the cross-bar NVM array and, for each portion/patch, to obtain (e.g. read out) an identifier value from the cross-bar NVM array identifying a particular image element from the dictionary image elements that corresponds to that portion/patch; means, such as circuit/module 1634, for inputting column identifier values for each of the portions/patches of the input image from the cross-bar array, the identifier values collectively representing a compressed version of the input image; means, such as circuit/module 1636, for controlling parallel image processing using a parallel set of cross-bar arrays; and means, such as circuit/module 1638, for outputting a compressed image.

Figure 17:
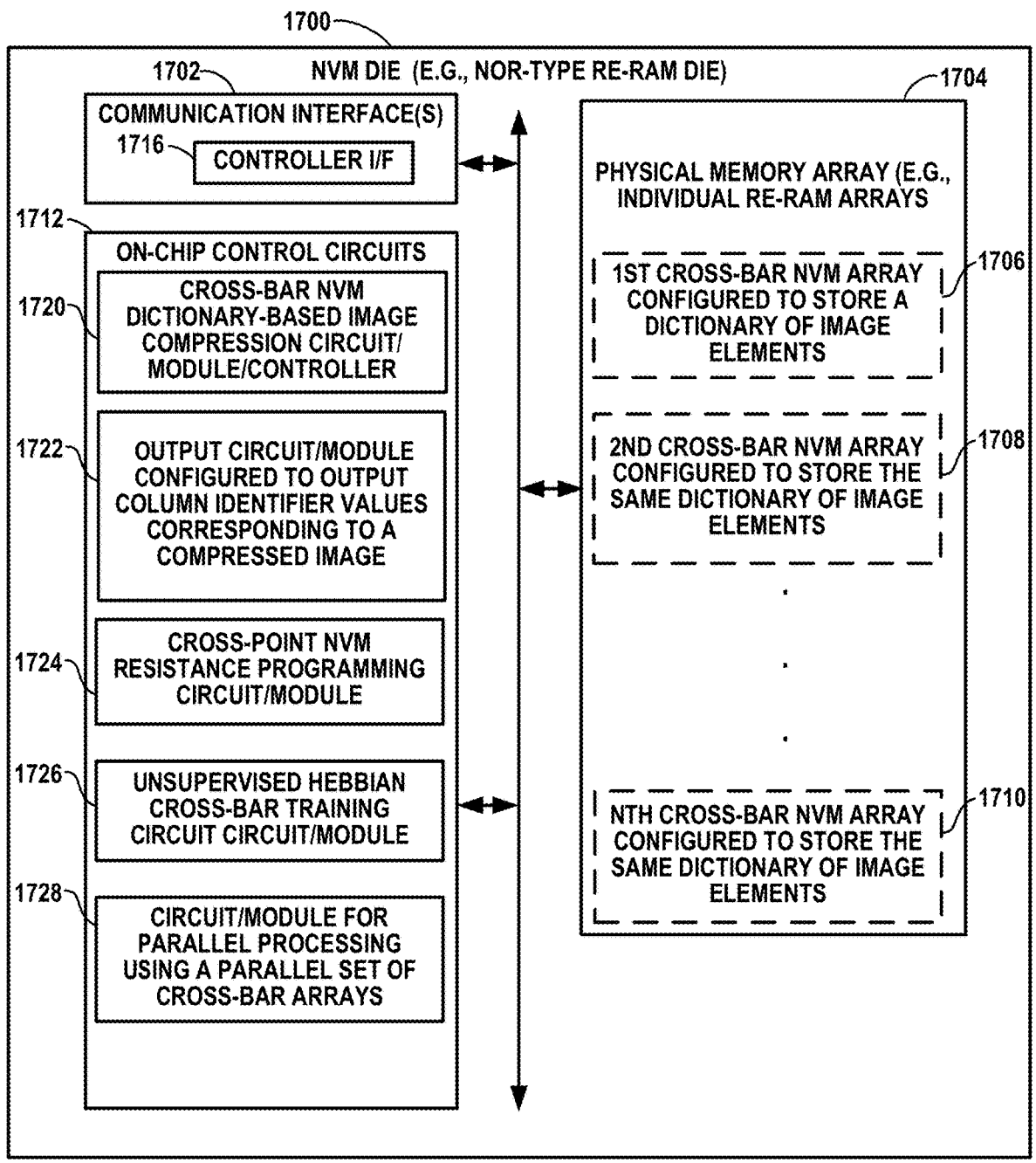
FIG. 17 illustrates an example of an NVM die (e.g., a ReRAM die), particularly highlighting exemplary components for use in training and image compression.

As noted, at least some of the logic or circuits may be provided within the ReRAM die itself, and an exemplary NVM die is shown in FIG. 17, which illustrates some such circuits.

FIG. 17 illustrates an embodiment of an NVM apparatus 1700 configured according to one or more aspects of the disclosure. The apparatus 1700, or components thereof, could embody or be implemented within a NOR-type ReRAM die or some other type of NVM device that supports cross-bar data storage. The apparatus 1700 includes a communication interface 1702, a physical memory array (e.g., ReRAM arrays) 1704, and a set of on-chip processing circuits 1712. These components can be coupled to and/or placed in electrical communication with one another via suitable components, represented generally by the connection lines in FIG. 17. Although not shown, other circuits such as timing sources, peripherals, voltage regulators, and power management circuits may be provided, which are well known in the art, and therefore, will not be described any further.

The physical memory array 1704 may represent one or more cross-bar ReRAM arrays, including, as shown, a 1st cross-bar NVM array 1706 configured to store a dictionary of image elements; a 2nd cross-bar NVM array 1708 configured to store the same dictionary of image elements; and a set of other cross-bar NVM arrays, including an Nth cross-bar NVM array 1710 configured to store the same dictionary of image elements.

The on-chip control circuits 1712 are arranged or configured to obtain, process and/or send data, control data access and storage, issue or respond to commands, and control other desired operations. For example, the circuits 1712 may be implemented as one or more processors, one or more controllers, and/or other structures configured to perform functions. For example, the circuits 1712 may be configured to perform at least some of the steps, functions, and/or processes described with respect to FIGS. 1-15.

According to at least one example of the apparatus 1700, the processing circuit 1710 may include one or more of: a cross-bar NVM dictionary-based image compression circuit/ module 1720 configured for compressing an image received from an device controller; an output circuit/module 1722 configured to output column identifier values corresponding to a compressed image to the device controller; a cross-point NVM resistance programming circuit/module 1724; a unsupervised Hebbian cross-bar training circuit circuit/module 1726; and a circuit/module 1728 for parallel processing using a parallel set of cross-bar arrays.

In at least some examples, means may be provided for performing the functions illustrated in FIG. 17 and/or other functions illustrated or described herein. For example, the means may include one or more of: means, such as circuit/ module 1720, for compressing an image received from an device controller; and means, such as output circuit/module 1722, for outputting column identifier values corresponding to a compressed image to the device controller; means, such as circuit/module 1724, for cross-point resistance value programming; means, such as circuit/module 1726, for a unsupervised Hebbian cross-bar training; and means, such as, circuit/module 1728, for parallel processing using a parallel set of cross-bar arrays.

Solid State Device (SSD) Example

Figure 18:
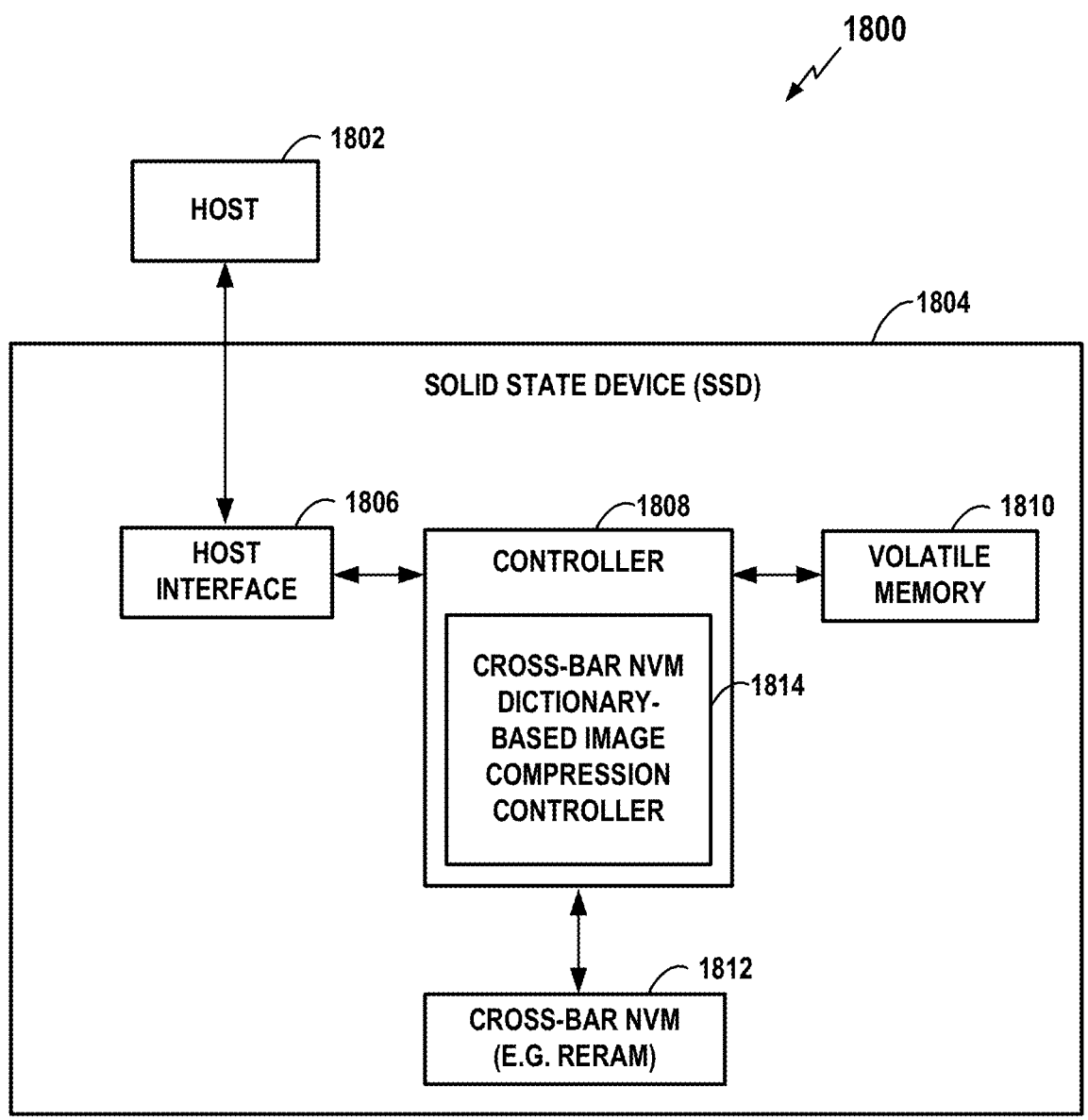
FIG. 18 is a block diagram of a data storage apparatus configured for image compression using a cross-bar NVM array such as a cross-bar ReRAM array.

FIG. 18 is a block diagram of a data storage apparatus or data storage system wherein the cross-bar array-based features described above are implemented within an SSD. The system 1800 includes a host 1802 and an SSD 1804 coupled to the host 1802. The host 1802 provides commands to the SSD 1804 for transferring data between the host 1802 and the SSD 1804, such as images to be compressed. The host 1802 may be any system or device with a compatible interface for communicating with the device 1804. For example, the host 1802 may be a computing device, a personal computer, a portable computer, or workstation, a server, a personal digital assistant, a digital camera, a digital phone, a self-driving control system for a vehicle, a security system for processing facial images, or the like.

The SSD 1804 includes a host interface 1806, a controller 1808, a volatile memory 1810, and a cross-bar NVM 1812, such as a NOR-type cross-bar ReRAM. The cross-bar NVM may include other storage elements, as well as various on-chip circuit/logic components. The host interface 1806 is coupled to the controller 1808 and facilitates communication between the host 1802 and the controller 1808. Additionally, the controller 1808 is coupled to the memory 1810 and the NVM 1812. The host interface 1806 may be any suitable type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some examples, the host interface 1806 exploits PCIe-NVMe (where NVMe refers to NVM Express). In some embodiments, the host 1802 includes the SSD 1804. In other embodiments, the SSD 1804 is remote with respect to the host 1802 or is contained in a remote computing system coupled in communication with the host 1802. For example, the host 1802 may communicate with the SSD 1804 through a wireless communication link. The controller 1808 controls operation of the SSD 1804. The controller 1808 receives commands from the host 1802 through the host interface 1806 and performs or executes the commands to transfer data between the host 1802 and the NVM 1812. The controller 1808 may include any type of processing device, such as a microprocessor, microcontroller, embedded controller, logic circuit, software, firmware, or the like, for controlling operation of the SSD 1804.

In some embodiments, some or all of the functions described herein as being performed by the controller 1808 may instead be performed by another element of the SSD 1804. For example, the SSD 1804 may include a microprocessor, a microcontroller, an embedded controller, a logic circuit, software, firmware, or any kind of processing device, for performing one or more of the functions described herein as being performed by the controller 1808. In some embodiments, one or more of the functions described herein as being performed by the controller 1808 are instead performed by the host 1802. In some embodiments, some or all of the functions described herein as being performed by the controller 1808 may instead be performed by another element such as a controller in a hybrid drive including both non-volatile memory elements and magnetic storage elements.

The volatile memory 1810 may be any memory, computing device, or system capable of storing data in a manner that is not necessarily persistent. For example, the volatile memory 1810 may be random-access memory (RAM), dynamic RAM (DRAM), static RAM (SRAM), synchronous dynamic RAM (SDRAM), flash storage, erasable programmable read-only-memory (EPROM), electrically erasable programmable ROM (EEPROM), or the like. In various embodiments, the controller 1808 uses the volatile memory 1810, or a portion thereof, to store data during the transfer of data between the host 1802 and the NVM 1812. For example, all or a portion of the volatile memory 1810 or a portion of the volatile memory 1810 may be a cache memory. Additionally, the volatile memory 1810 may be used to store volatile versions of image dictionary elements during processing to facilitate high-speed image decompression.

The cross-bar NVM 1812 receives data or information from the controller 1808 and stores the data or information within its storage elements or arrays. In particular, the NVM 1812 can receive sets of training images and store image dictionary elements derived from the training elements within its cross-bar arrays. The NVM may thereafter receive images to be compressed, which are applied to the cross-bar arrays of the NVM to compress the images (by, e.g., reading out or otherwise obtaining cross-bar column array indices that identify the dictionary elements that correspond to patches of the image). The NVM 1812 may be any type of NVM that may be configured to provide cross-bar storage of values, such as a cross-bar ReRAM array. In some examples, the NVM 1812 may be a component of a suitably-equipped flash storage system, solid state drive, flash memory card, secure digital (SD) card, universal serial bus (USB) memory device, CompactFlash card, SmartMedia device, flash storage array, or the like.

The controller 1808 and cross-bar NVM 1812 can be configured, alone or in combination, to perform the processes described herein for training (configuring) the cross-bar elements of the NVM 1812 and then compressing images using the cross-bar elements. As shown in FIG. 18, the exemplary controller 1808 includes a cross-bar NVM dictionary-based image compression controller 1814, which is configured to control the training of the cross-bar elements of the NVM 1812 and the subsequent compressing of input images using the NVM cross-bar elements. In other examples, the training procedures used to generate or derive the various dictionary elements are performed off-line using a separate device (such as a remote server) and the resulting values of the dictionary elements are then stored in the NVM 1812. It is noted that any subsequent decompression of images may be performed by the host 1802, which may be programmed or configured to obtain a compressed version of an image from the device 1800 (e.g. a list of dictionary elements that correspond to the patches of the image and any corresponding grayscale values) and to then decompress the image by looking up the dictionary elements from its memory components and assembling the elements into two-dimensional image.

Additional Aspects

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Aspects of the subject matter described herein can be implemented in semiconductor memory devices include volatile memory devices, such as DRAM or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration. In many examples herein, the NVM cross-bar array is a NOR-type array.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the z direction) with each column having multiple memory elements in each column. The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-y) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration. As noted, in many examples, the NVM crossbar array is a NOR-type array.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC) Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A non-volatile memory (NVM) die, comprising:
   a cross-bar NVM array;
   a training image input circuit configured to input a set of training images; and
   a cross-bar training circuit configured to generate and store a dictionary of image elements within the cross-bar NVM array for use in image compression, wherein the cross-bar training circuit is configured to generate the dictionary of image elements from the set of training images;
   wherein the cross-bar NVM array includes a plurality of individual cross-bar NVM arrays, each configured to store the dictionary of image elements; and
   wherein the cross-bar training circuit is further configured to set cross-point resistance values of each individual cross-bar NVM array of the plurality of individual cross-bar NVM arrays based on the training images to store the dictionary of image elements.

2. The NVM die of claim 1, wherein the cross-bar training circuit further comprises:
   a cross-point resistance programming circuit configured to set the cross-point resistance values of at least one of the plurality of individual cross-bar NVM arrays to store individual elements of the dictionary of image elements within individual columns of the at least one of the plurality of individual cross-bar NVM arrays.

3. The NVM die of claim 2, wherein the cross-point resistance programming circuit comprises:
   an image patch selection circuit configured to select a set of image patches from within each of the set of training images; and
   a sequential training circuit configured to sequentially apply each of the set of image patches from each of the set of training images to the at least one of the plurality of individual cross-bar NVM arrays to iteratively configure the cross-point resistance values to generate and store the dictionary of image elements.

4. The NVM die of claim 3:
wherein each of the set of image patches comprises an m×m array of M pixels, the dictionary of image elements comprises N image elements, each image element comprising an m×m array of M pixels, and each individual cross-bar NVM array is an N×M array comprising N columns, each of which includes M cross-point resistance values, and
wherein the cross-point resistance programming circuit is further configured to set each of the N×M cross-point resistance values of each individual cross-bar NVM array based on the set of training images.

5. The NVM die of claim 1, wherein the cross-bar training circuit comprises:
an unsupervised cross-bar training circuit configured to set the cross-point resistance values of at least one of the plurality of individual cross-bar NVM arrays using an unsupervised training procedure.

6. A method for training a cross-bar non-volatile memory (NVM) array of an NVM die that includes a cross-bar training circuit, the method comprising:
applying a set of image compression training images to the cross-bar NVM array using the cross-bar training circuit; and
determining and setting cross-point values of the cross-bar NVM array based on the image compression training images using the cross-bar training circuit to generate and store a dictionary of image elements within the cross-bar NVM array for use in image compression;
wherein the cross-point values are resistance values set based on the training images to store individual elements of the dictionary of image elements within individual columns of the cross-bar NVM array; and
wherein applying the set of training images to the cross-bar NVM array comprises sequentially applying each of a set of image patches of each of the set of training images to the cross-bar NVM array to iteratively configure cross-point resistance values.

7. The method of claim 6, wherein the cross-bar NVM array includes a plurality of individual cross-bar NVM arrays, each configured to store the dictionary of image elements, and wherein the cross-point resistance values of each individual cross-bar NVM array are trained based on the training images to store the dictionary of image elements.

8. The method of claim 6, wherein determining and setting the cross-point resistance values of the cross-bar NVM array comprises:
(a) selecting a patch of a training image from the set of training images;
(b) modifying resistance values of cross-point elements of the cross-bar NVM array based on the selected patch to conform the resistance values of one column of the cross-bar NVM array to the patch of the image;
(c) repeating (a) and (b) with additional patches of the training image to further modify the resistance values of the cross-point elements to conform the resistance values of the same or other columns of the cross-bar NVM array to the additional patches of the image; and
(d) repeating (a), (b), and (c) with additional training images of the set to further modify the resistance values of the cross-point elements until the resistance values of each particular column of the cross-bar NVM array corresponds to one of the image elements of the dictionary.

9. The method of claim 6, wherein the cross-point resistance values of the cross-bar NVM array are configured based on the training images using an unsupervised training procedure.

10. A non-volatile memory (NVM) die, comprising:
a cross-bar NVM array configured to store a dictionary of image elements;
a cross-bar NVM dictionary-based image compression circuit configured to apply a set of portions of an input image to the cross-bar NVM array and, for each portion, to obtain an identifier value from the cross-bar NVM array identifying a particular image element from the dictionary of image elements that corresponds to that portion; and
a dictionary element identifier output circuit configured to output the identifier values for each of the portions of the input image;
wherein cross-point resistance values of the cross-bar NVM array are pre-configured to store individual elements of the dictionary of image elements within individual columns of the cross-bar NVM array; and
wherein the cross-bar NVM dictionary-based image compression circuit is further configured to read the identifier value by reading a column identifier value from the cross-bar NVM array.

11. The NVM die of claim 10, wherein the cross-bar NVM dictionary-based image compression circuit is further configured to apply the set of portions of the input image to the cross-bar NVM array by applying each of a set of image patches to the cross-bar NVM array.

12. The NVM die of claim 10, wherein the cross-bar NVM array includes a plurality of individual cross-bar NVM arrays configured to operate in parallel, each configured to store the dictionary of image elements, and wherein the cross-bar NVM dictionary-based image compression circuit is further configured to apply each individual portion of the input image to a corresponding one of the individual cross-bar NVM arrays.

13. A method for image compression using a cross-bar non-volatile memory (NVM) array of an NVM die that includes a cross-bar training circuit, the cross-bar NVM array configured to store a dictionary of image elements, the method comprising:
applying a set of portions of an input image to the cross-bar NVM array using the cross-bar training circuit, wherein cross-point values of the cross-bar NVM array are pre-configured to store individual values of the dictionary of image elements within individual columns of the cross-bar NVM array;
for each portion of the set of portions, obtaining an identifier value from the cross-bar NVM array using the cross-bar training circuit, wherein the identifier value identifies a particular image element from the dictionary that corresponds to that portion, and wherein obtaining the identifier value identifying the particular image element that corresponds to that portion comprises reading out a column identifier value from the cross-bar NVM array; and
outputting the identifier values from the NVM die for each of the portions of the input image, the identifier values collectively representing a compressed representation of the input image.

14. The method of claim 13, wherein applying the set of portions of the input image to the cross-bar NVM array comprises applying each of a set of image patches.

15. The method of claim 13, wherein the cross-bar NVM array includes a plurality of individual cross-bar NVM arrays operating in parallel, each storing the dictionary of image elements, and wherein each individual portion of the input image is an image patch applied to a corresponding one of the individual cross-bar NVM arrays.

16. A device, comprising:
a cross-bar non-volatile memory (NVM) array;
a training image input circuit configured to input a set of training images; and
a cross-bar training circuit configured to generate and store a dictionary of image elements within the cross-bar NVM array for use in image compression, wherein the cross-bar training circuit is configured to generate the dictionary of image elements from the set of training images;
wherein the cross-bar training circuit includes a cross-point resistance programming circuit configured to set cross-point resistance values of the cross-bar NVM array to store individual elements of the dictionary of image elements within individual columns of the cross-bar NVM array, the cross-point resistance programming circuit including a sequential training circuit configured to sequentially apply each of a set of image patches from each of the set of training images to the cross-bar NVM array to iteratively configure the cross-point resistance values to generate and store the dictionary of image elements.

17. The device of claim 16,
wherein each of the set of image patches comprises an m×m array of M pixels, the dictionary of image elements comprises N image elements, each image element comprising an m×m array of M pixels, and the cross-bar NVM array is an N×M array comprising N columns, each of which includes M cross-point resistance values, and
wherein the cross-point resistance programming circuit is further configured to set each of the N×M cross-point resistance values of the cross-bar NVM array based on the set of training images.

18. The device of claim 16, wherein the cross-bar NVM array includes a plurality of individual cross-bar NVM arrays, each configured to store the dictionary of image elements, and wherein the cross-bar training circuit is further configured to set the cross-point resistance values of each individual cross-bar NVM array of the plurality of individual cross-bar NVM arrays based on the training images to store the dictionary of image elements.

19. The device of claim 16, wherein the cross-bar training circuit comprises:
an unsupervised cross-bar training circuit configured to set the cross-point resistance values of the cross-bar NVM array using an unsupervised training procedure.

20. A device, comprising:
a cross-bar non-volatile memory (NVM) array configured to store a dictionary of image elements, wherein cross-point resistance values of the cross-bar NVM array are pre-configured to store individual elements of the dictionary of image elements within individual columns of the cross-bar NVM array;
a cross-bar NVM dictionary-based image compression circuit configured to apply a set of portions of an input image to the cross-bar NVM array and, for each portion, to obtain an identifier value from the cross-bar NVM array identifying a particular image element from the dictionary of image elements that corresponds to that portion; and a dictionary element identifier output circuit configured to output the identifier values for each of the portions of the input image.

21. The device of claim 20, further comprising:
a cross-point resistance programming circuit configured to set the cross-point resistance values of the cross-bar NVM array to store individual elements of the dictionary of image elements within individual columns of the cross-bar NVM array.

22. The device of claim 20, wherein the cross-bar NVM array includes a plurality of individual cross-bar NVM arrays, each configured to store the dictionary of image elements, and wherein the device further comprises a cross-bar training circuit configured to set the cross-point resistance values of each individual cross-bar NVM array of the plurality of individual cross-bar NVM arrays based on training images to store the dictionary of image elements.

23. The device of claim 20, further comprising:
an unsupervised cross-bar training circuit configured to set cross-point resistance values of the cross-bar NVM array using an unsupervised training procedure.

24. A device, comprising:
a cross-bar non-volatile memory (NVM) array configured to store a dictionary of image elements, wherein the cross-bar NVM array includes a plurality of individual cross-bar NVM arrays configured to operate in parallel, each configured to store the dictionary of image elements;
a cross-bar NVM dictionary-based image compression circuit configured to apply a set of portions of an input image to the cross-bar NVM array and, for each portion, to obtain an identifier value from the cross-bar NVM array identifying a particular image element from the dictionary of image elements that corresponds to that portion; and
a dictionary element identifier output circuit configured to output the identifier values for each of the portions of the input image.

25. The device of claim 24, further comprising:
a cross-point resistance programming circuit configured to set cross-point resistance values of the cross-bar NVM array to store individual elements of the dictionary of image elements within individual columns of each of the individual cross-bar NVM arrays.

26. The device of claim 24, further comprising:
a cross-bar training circuit configured to set cross-point resistance values of each individual cross-bar NVM array of the plurality of individual cross-bar NVM arrays based on training images to store the dictionary of image elements.

27. The device of claim 24, further comprising:
an unsupervised cross-bar training circuit configured to set cross-point resistance values of the cross-bar NVM array using an unsupervised training procedure.

28. A method for image compression using a cross-bar non-volatile memory (NVM) array configured to store a dictionary of image elements, wherein the cross-bar NVM array includes a plurality of individual cross-bar NVM arrays operating in parallel, each storing the dictionary of image elements, the method comprising:
applying a set of portions of an input image to the cross-bar NVM array;
for each portion of the set of portions, obtaining an identifier value from the cross-bar NVM array identifying a particular image element from the dictionary that corresponds to that portion; and outputting the identifier values for each of the portions of the input image, the identifier values collectively representing a compressed representation of the input image.

29. The method of claim 28, wherein applying the set of portions of the input image to the cross-bar NVM array comprises applying each of a set of image patches.

30. The method of claim 28, wherein each individual portion of the input image is an image patch applied to a corresponding one of the individual cross-bar NVM arrays.

31. The method of claim 28, further comprising setting cross-point resistance values of each individual cross-bar NVM array of the plurality of individual cross-bar NVM arrays based on training images to store the dictionary of image elements.

* * * * *